(12) United States Patent
Yamamoto

(10) Patent No.: US 8,686,942 B2
(45) Date of Patent: Apr. 1, 2014

(54) OPERATION INPUT SYSTEM, CONTROL APPARATUS, HANDHELD APPARATUS, AND OPERATION INPUT METHOD

(75) Inventor: Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 707 days.

(21) Appl. No.: 12/823,577

(22) Filed: Jun. 25, 2010

(65) Prior Publication Data

US 2011/0043448 A1 Feb. 24, 2011

(30) Foreign Application Priority Data

Aug. 18, 2009 (JP) ................................. 2009-189486

(51) Int. Cl.
*G06F 3/033* (2013.01)

(52) U.S. Cl.
USPC ........... 345/157; 345/156; 345/158; 345/162; 345/169; 345/173

(58) Field of Classification Search
None
See application file for complete search history.

(56) References Cited

U.S. PATENT DOCUMENTS

| | | | | |
|---|---|---|---|---|
| 5,181,181 A | * | 1/1993 | Glynn | 702/141 |
| 5,995,081 A | * | 11/1999 | Kato | 345/156 |
| 6,164,808 A | * | 12/2000 | Shibata et al. | 700/85 |
| 6,411,278 B1 | * | 6/2002 | Kage et al. | 345/158 |
| 7,030,856 B2 | * | 4/2006 | Dawson et al. | 345/158 |
| 7,194,702 B1 | * | 3/2007 | Peasley | 715/856 |
| 7,489,298 B2 | * | 2/2009 | Liberty et al. | 345/158 |
| 7,672,806 B2 | * | 3/2010 | Tronconi et al. | 702/141 |
| 8,223,121 B2 | * | 7/2012 | Shaw et al. | 345/158 |
| 8,552,977 B2 | * | 10/2013 | Yamamoto et al. | 345/157 |
| 2004/0140962 A1 | * | 7/2004 | Wang et al. | 345/179 |
| 2006/0244738 A1 | * | 11/2006 | Nishimura et al. | 345/179 |
| 2006/0252541 A1 | * | 11/2006 | Zalewski et al. | 463/36 |
| 2007/0060228 A1 | * | 3/2007 | Akasaka et al. | 463/1 |
| 2007/0188444 A1 | * | 8/2007 | Vale et al. | 345/156 |
| 2009/0326847 A1 | * | 12/2009 | Ohta | 702/93 |
| 2010/0103095 A1 | * | 4/2010 | Yamamoto et al. | 345/156 |
| 2010/0144447 A1 | * | 6/2010 | Nonaka et al. | 463/43 |
| 2010/0182238 A1 | * | 7/2010 | Chen | 345/166 |

FOREIGN PATENT DOCUMENTS

JP 2007-61489 3/2007
WO WO 2009/035005 A1 3/2009

* cited by examiner

*Primary Examiner* — Dismery Mercedes
(74) *Attorney, Agent, or Firm* — Oblon, Spivak, McClelland, Maier & Neustadt, L.L.P.

(57) ABSTRACT

An operation input system includes a casing and a motion sensor for detecting a movement of the casing inside the casing and calculates a position of the casing in a predetermined space based on an output of the motion sensor. The operation input system includes a position sensor and a correction section. The position sensor directly detects the position of the casing in the predetermined space. The correction section corrects the output of the motion sensor using an output of the position sensor.

18 Claims, 19 Drawing Sheets

$S\omega(t0) = V(t0) - Vref = \omega(t0)$ $S\omega(t1) = V(t1) - Vref \neq \omega(t1)$
$S\omega(t2) = V(t2) - Vref \neq \omega(t2)$ $S\omega(t1) = V(t1) - Vref(t1) = \omega(t1)$
$S\omega(t2) = V(t2) - Vref(t2) = \omega(t2)$ Trajectory of coordinates based on angular velocity values Trajectory of coordinates based on image

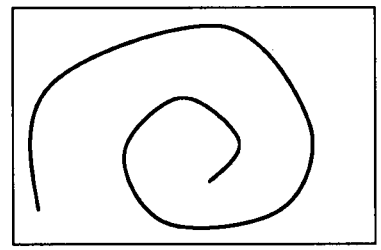 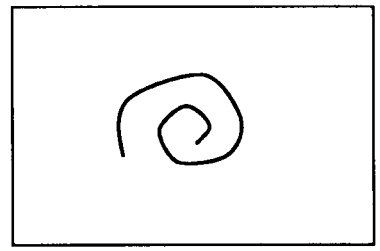
Trajectory obtained when R(t) is small (e.g., operation using wrist)
Trajectory obtained when R(t) is large (e.g., operation using entire arm)
FIG.15A        FIG.15B

OPERATION INPUT SYSTEM, CONTROL APPARATUS, HANDHELD APPARATUS, AND OPERATION INPUT METHOD

BACKGROUND OF THE INVENTION

1. Field of the Invention

The present invention relates to an operation input system, a control apparatus, a handheld apparatus, and an operation input system for controlling, for example, a movement of a pointer on a screen.

2. Description of the Related Art

Pointing devices, particularly a mouse and a touchpad, are used as controllers for GUIs (Graphical User Interfaces) widely used in PCs (Personal Computers). Not just as HIs (Human Interfaces) of PCs as in the related art, the GUIs are now starting to be used as an interface for AV equipment and game devices used in living rooms etc. with, for example, televisions as image media. Various pointing devices that a user is capable of operating 3-dimensionally are proposed as controllers for the GUIs of this type (see, for example, International Patent WO 2009/035005 (paragraphs [0093] and [0094]; hereinafter, referred to as Patent Document 1) and Japanese Patent Application Laid-open No. 2007-61489 (paragraph [0074]); hereinafter, referred to as Patent Document 2)).

For example, Patent Document 1 discloses a control system for detecting a relative movement of an input apparatus with respect to a screen based on outputs of an angular velocity sensor and an acceleration sensor incorporated in the input apparatus. This control system controls display of a pointer on the screen based on detection signals of various sensors transmitted from the input apparatus.

Moreover, Patent Document 2 discloses an information processing system that includes a controller in which an image pickup device such as a CMOS sensor and a CCD that picks up images of two markers (red-color LED) provided on the periphery of a monitor is incorporated. This information processing system obtains an operation signal corresponding to a position and posture of the controller based on imaged data of the markers transmitted from the controller.

SUMMARY OF THE INVENTION

In a method of calculating a position of a pointer on a screen based on outputs of an angular velocity sensor and an acceleration sensor, current coordinate values of the pointer are integrated using velocity values as the outputs of the angular velocity sensor and the acceleration sensor to generate new coordinate values.

Therefore, a calculation load of coordinate values is small and a calculation speed can be raised easily.

Such an advantage, however, bears the following problems. The angular velocity sensor and the acceleration sensor each output a fluctuation of a potential with respect to a reference potential called DC (Direct Current) offset as a detection signal. Here, the DC offset fluctuates due to device characteristics constituting a sensor (temperature drift, change in vibration mode, etc.), an external stress, and circuit characteristics of an analog circuit (temperature characteristics, time constant, SN ratio of amplifier output, etc.), and a transition of the fluctuation is not uniform. Therefore, in the system that calculates coordinates of the pointer by an integration using detection signals of the angular velocity sensor and the acceleration sensor, there has been a case where errors due to the fluctuation of the DC offset are accumulated to thus cause deterioration of an operational feeling.

Moreover, a detected position of the casing does not necessarily match an actual operation since a value detected by the angular velocity sensor is a time change rate of an angle, and operational awkwardness may thus be caused. There has also been a problem that an operational direction is deviated when the input apparatus is tilted in a roll direction.

Further, when an attempt to draw with a pointer on a display screen is made, for example, it has been necessary to perform an integration in the case of the angular velocity sensor and a double integration in the case of the acceleration sensor for obtaining drawing coordinates. As a result, there has been a problem that the coordinates are eventually deviated from a reference position at a time an operation is started due to accumulated integration errors, and an operational feeling thus deteriorates.

Furthermore, there has also been a problem that measures for simplifying operational inputs (hand movement correction, velocity gain variability, pointer movement availability, etc.) promotes the deviation from the reference position.

On the other hand, when using an image sensor, there has been problems that, for example, a response is slow due to a large calculation load, an operation cannot be made outside a field angle of the image sensor (moreover, cannot be too far nor close even in field angle), where within space the field angle is positioned is unclear, and operational resolution is low.

In view of the circumstances as described above, there is a need for an operation input system, a control apparatus, a handheld apparatus, and an operation input method that are capable of improving operability while making use of advantages that are obtained when using a motion sensor.

According to an embodiment of the present invention, there is provided an operation input system that includes a casing and a motion sensor for detecting a movement of the casing inside the casing and calculates a position of the casing in a predetermined space based on an output of the motion sensor. The operation input system includes a position sensor and a correction means. The position sensor directly detects the position of the casing in the predetermined space. The correction means corrects the output of the motion sensor using an output of the position sensor.

In the operation input system that calculates the position of the casing in the predetermined space based on the output of the motion sensor for detecting the movement of the casing inside the casing according to the embodiment of the present invention, the correction means corrects the output of the motion sensor using the output of the position sensor for directly detecting the position of the casing in the predetermined space. With this structure, as a calculation result on the position of the casing in the predetermined space that is based on the output of the motion sensor, a result that matches an intuition of a user more can be obtained.

As the motion sensor, for example, an inertia sensor such as an angular velocity sensor and an acceleration sensor is used. Moreover, an image sensor including an image pickup device and a ranging sensor such as an ultrasonic sensor and a laser displacement sensor can be used as the position sensor, for example.

The correction means calculates information for correcting the output of the motion sensor based on a relationship between the output of the motion sensor within a predetermined time and the output of the position sensor within the predetermined time. Here, the information for correcting the output of the motion sensor also includes information obtained at a time the correction of the output of the motion sensor is 0. The calculated correction information is reflected on the output of the motion sensor obtained in a next cycle or cycles after that, for example.

Specifically, in the embodiment of the present invention, the motion sensor detects the movement of the casing in a space of a two or more dimension, and the position sensor directly detects the position of the casing in the space of a two or more dimension. In this case, the correction means may calculate the information for correcting the output of the motion sensor based on a relationship between the movement of the casing obtained from the output of the motion sensor and a positional change of the casing detected by the position sensor.

The motion sensor outputs a potential fluctuation with respect to a set reference potential as a detection signal, and the correction means calculates a calibration value of the reference potential as the information for correcting the output of the motion sensor. In this case, the correction means may calculate the information for correcting the output of the motion sensor based on a relationship between an integration value of the output of the motion sensor and a displacement amount of the output of the position sensor, for example. With this structure, a more-appropriate reference potential that follows a fluctuation of device characteristics constituting the motion sensor can be obtained, and a result that matches an intuition of the user more can be obtained as a calculation result on the position of the casing in the predetermined space that is based on the output of the motion sensor.

The correction means may calculate the information for correcting the output of the motion sensor based on the integration value of the output of the motion sensor at a time the displacement amount of the output of the position sensor becomes a predetermined value or less. Specifically, in the embodiment of the present invention, the time the displacement amount of the output of the position sensor becomes a predetermined value or less is a time the casing is in a static state or an almost-static state, and the correction information is calculated assuming that the output of the motion sensor at this time is a fluctuation component of device characteristics constituting the motion sensor. Accordingly, a more-appropriate reference potential that follows the fluctuation of the device characteristics constituting the motion sensor can be obtained, and a result that matches an intuition of the user more can be obtained as a calculation result on the position of the casing in the predetermined space that is based on the output of the motion sensor.

Further, the correction means may calculate the information for correcting the output of the motion sensor based on a relationship between a first trajectory of the movement of the casing obtained from the output of the motion sensor and a second trajectory of a positional change of the casing detected by the position sensor. In this case, the correction means may calculate a difference between a rotational angle of the first trajectory and that of the second trajectory as the information for correcting the output of the motion sensor. With this structure, a tilt component included in the output of the motion sensor at a time the casing is operated while being tilted in a roll direction can be suppressed or eliminated, and a result that matches an intuition of the user more can be obtained as a calculation result on the position of the casing in the predetermined space that is based on the output of the motion sensor.

Furthermore, the correction means may calculate the information for correcting the output of the motion sensor based on a relationship between a first displacement amount of the movement of the casing calculated from the output of the motion sensor and a second displacement amount of the position of the casing detected by the position sensor. In this case, the correction means may calculate a ratio of the first displacement amount to the second displacement amount as the information for correcting the output of the motion sensor. With this structure, an influence of a difference in radius gyrations obtained at a time the casing is operated on the calculation result on the position of the casing that is based on the output of the motion sensor can be suppressed or eliminated, and a result that matches an intuition of the user more can be obtained.

Moreover, the correction means may calculate the information for correcting the output of the motion sensor based on a relationship between a first position of the casing obtained from the output of the motion sensor and a second position of the casing detected by the position sensor. In this case, the correction means may calculate a difference between the first position and the second position as the information for correcting the output of the motion sensor. With this structure, integration errors included in the calculation result on the position of the casing that is based on the output of the motion sensor can be suppressed or eliminated, and a result that matches an intuition of the user more can be obtained.

Furthermore, the operation input system in which the correction means calculates the information for correcting the output of the motion sensor based on the relationship between the first position of the casing obtained from the output of the motion sensor and the second position of the casing detected by the position sensor may further include a switch means and a coordinate reference change means. The switch means switches on/off the output of the motion sensor. The coordinate reference change means changes one of a reference of spatial coordinates of the position sensor and a reference of spatial coordinates of the motion sensor using a difference between a first position of the casing calculated right before the output of the motion sensor is switched off by the switch means and a second position of the casing calculated right after the output of the motion sensor is switched on by the switch means. With this structure, the position of the casing at a time point the output of the motion sensor is switched off by the switch means and the position of the casing at a time point the output of the motion sensor is switched on by the switch means after that can be made to match each other.

As described above, according to the embodiment of the present invention, operability can be improved while making use of advantages obtained when using a motion sensor.

These and other objects, features and advantages of the present invention will become more apparent in light of the following detailed description of best mode embodiments thereof, as illustrated in the accompanying drawings.

BRIEF DESCRIPTION OF DRAWINGS

FIG. 15 are diagrams for explaining a necessity of carrying out processing of correcting angular velocities into pseudo linear velocities according to a third embodiment of the present invention;

DESCRIPTION OF PREFERRED EMBODIMENTS

Hereinafter, embodiments of the present invention will be described with reference to the drawings.

First Embodiment

Overall Structure of Operation Input System and Sectional Structures Thereof

Figure 1:
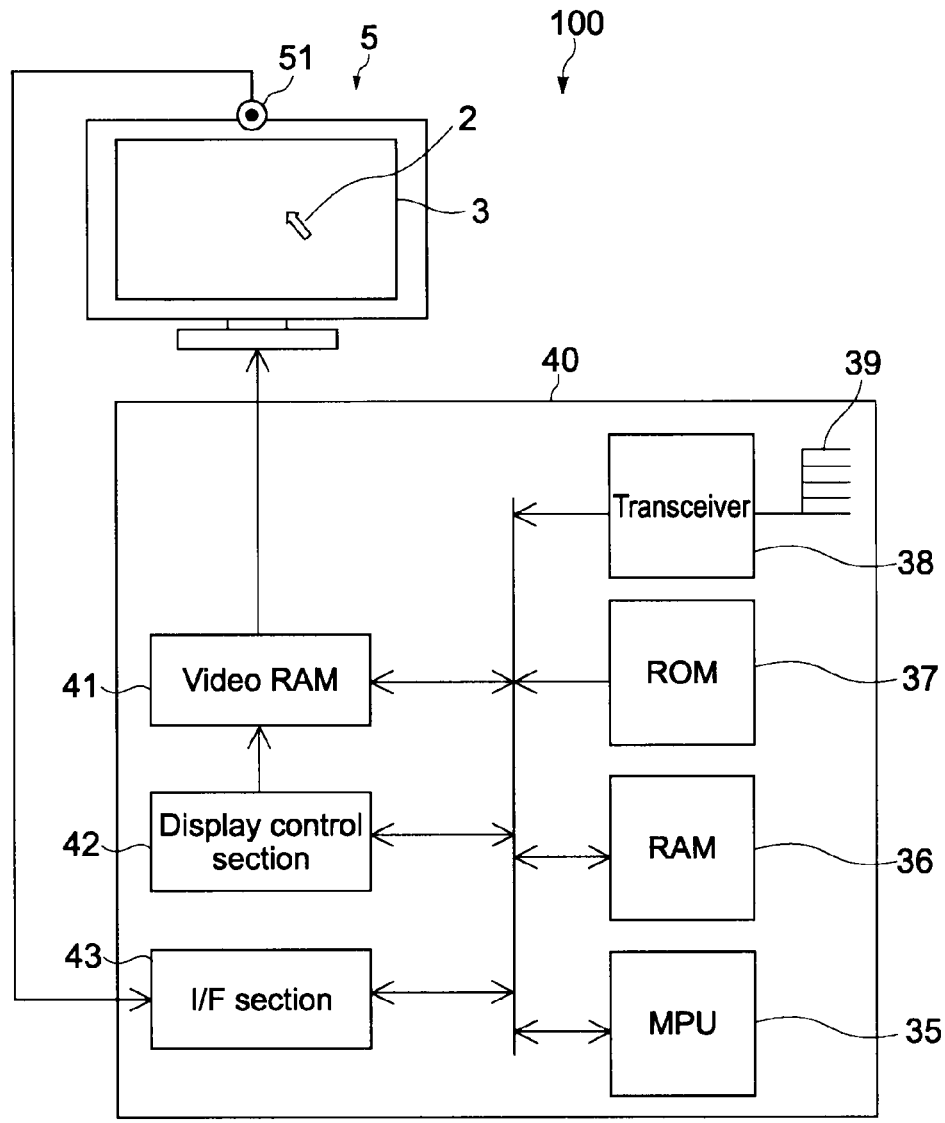
FIG. 1 is a schematic structural diagram of an operation input system according to a first embodiment of the present invention.
Figure 1:
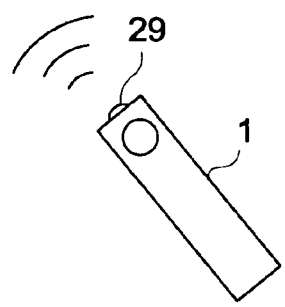

FIG. 1 is a diagram showing an operation input system according to a first embodiment of the present invention. An operation input system 100 includes a display apparatus 5, a control apparatus 40, and an input apparatus 1.

Examples of the display apparatus 5 include a liquid crystal display and an EL (Electro-Luminescence) display.

The display apparatus 5 may alternatively be an apparatus integrally formed with a display and capable of receiving television broadcasts and the like or an apparatus in which such a display and the control apparatus 40 are integrated. A camera section 51 including an image sensor is provided in the display apparatus 5.

The camera section 51 has a field of view on a front side of the display apparatus 5 and includes an image sensor for taking in images including a luminous point of a light-emitting portion 29 of the input apparatus 1. The images taken by the image sensor are transferred to the control apparatus 40 in a constant time cycle. Examples of the image sensor include a CCD (Charge Coupled Device) and a CMOS (Complementary Metal-Oxide Semiconductor).

Figure 2:
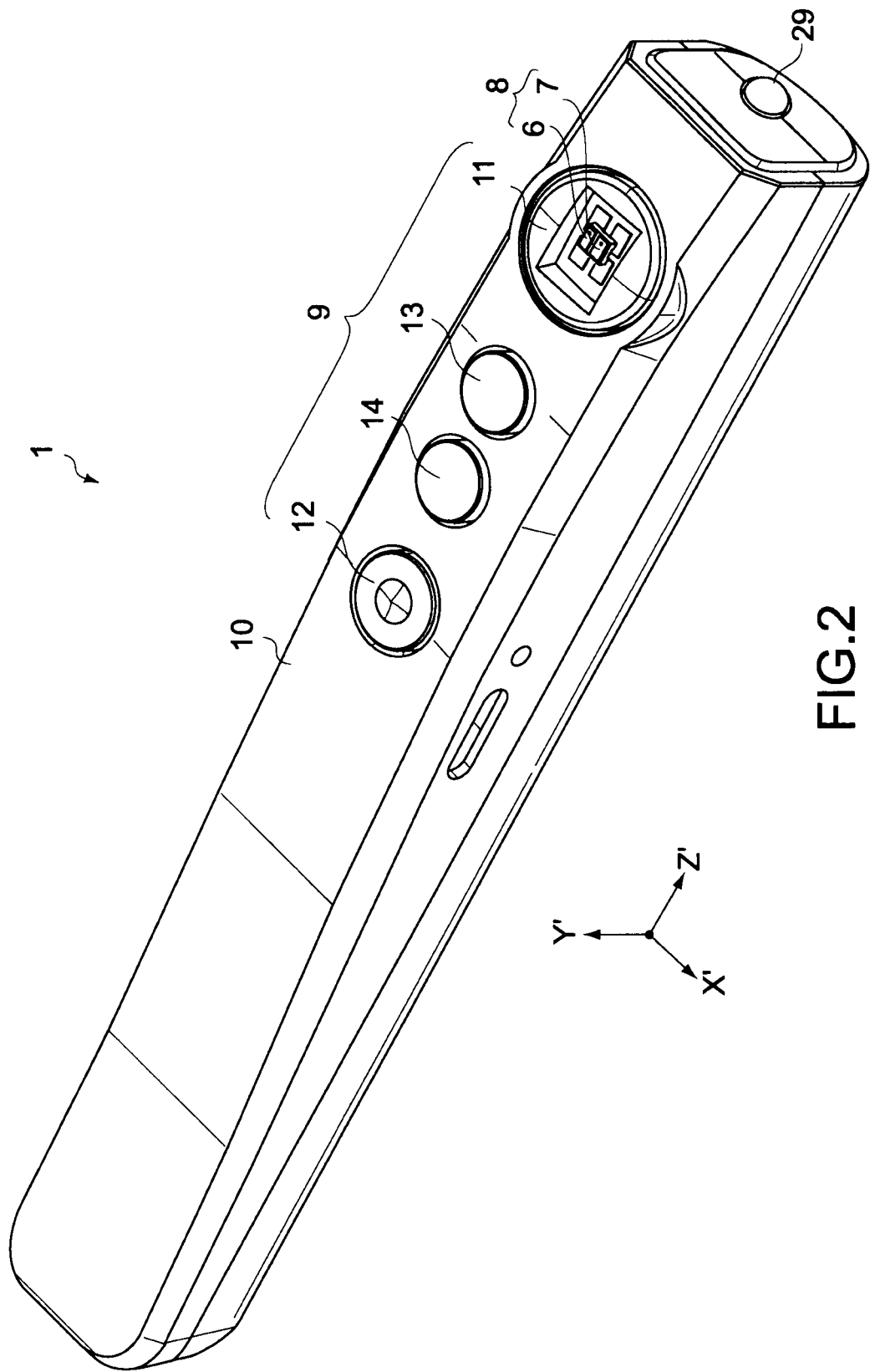
FIG. 2 is a perspective view of an input apparatus according to the first embodiment of the present invention.

FIG. 2 is a perspective view showing the input apparatus 1. As shown in FIG. 2, the input apparatus 1 includes a casing 10, and an operation section 9 is provided at an upper portion of the casing 10. The casing 10 is elongated in one direction and is of a size that a user is capable of holding.

The operation section 9 includes a button 11 provided on a tip end portion side of the upper portion of the casing 10, a button 12 provided near a center of the upper portion of the casing 10, and buttons 13 and 14 provided between the buttons 11 and 12.

The button 11 is an operation section with which a 2-step switch is possible. The button 11 includes a built-in optical sensor 8 which functions as a first switch. The button 11 also includes a switch 23 (see FIG. 3) for detecting a press of the button 11 inside the casing 10, the switch 23 functioning as a second switch.

The first switch of the button 11 is allocated a function as a pointer movement availability button, that is, a function for the user to arbitrarily switch whether a pointer 2 can be moved. On the other hand, the second switch of the button 11 is allocated a function as a determination button (e.g., function corresponding to left button of planar-operation-type mouse).

Here, a form in which the pointer 2 becomes movable on a screen 3 in a case where a finger of the user is located above the button 11 and a form in which the pointer 2 becomes movable on the screen 3 in a case where the finger of the user is not located above the button 11 are exemplified.

The button 12 provided near the center of the casing 10 is allocated a function corresponding to a right button of a mouse. Further, the buttons 13 and 14 are allocated functions of turning up/down a volume, fast-forwarding and rewinding a moving image displayed on the screen 3, and changing channels of broadcast programs and the like.

It should be noted that the arrangement of the buttons 11 to 14 and the functions allocated to those buttons can be changed as appropriate.

The light-emitting portion 29 is provided at a tip end of the upper portion of the casing 10 of the input apparatus 1. The light-emitting portion 29 is, for example, an infrared LED (Light Emitting Diode). Considering ease in being separated from ambient light, it is desirable to modulate blinking of the light-emitting portion 29 based on a timing, a frequency, and the like.

Figure 3:
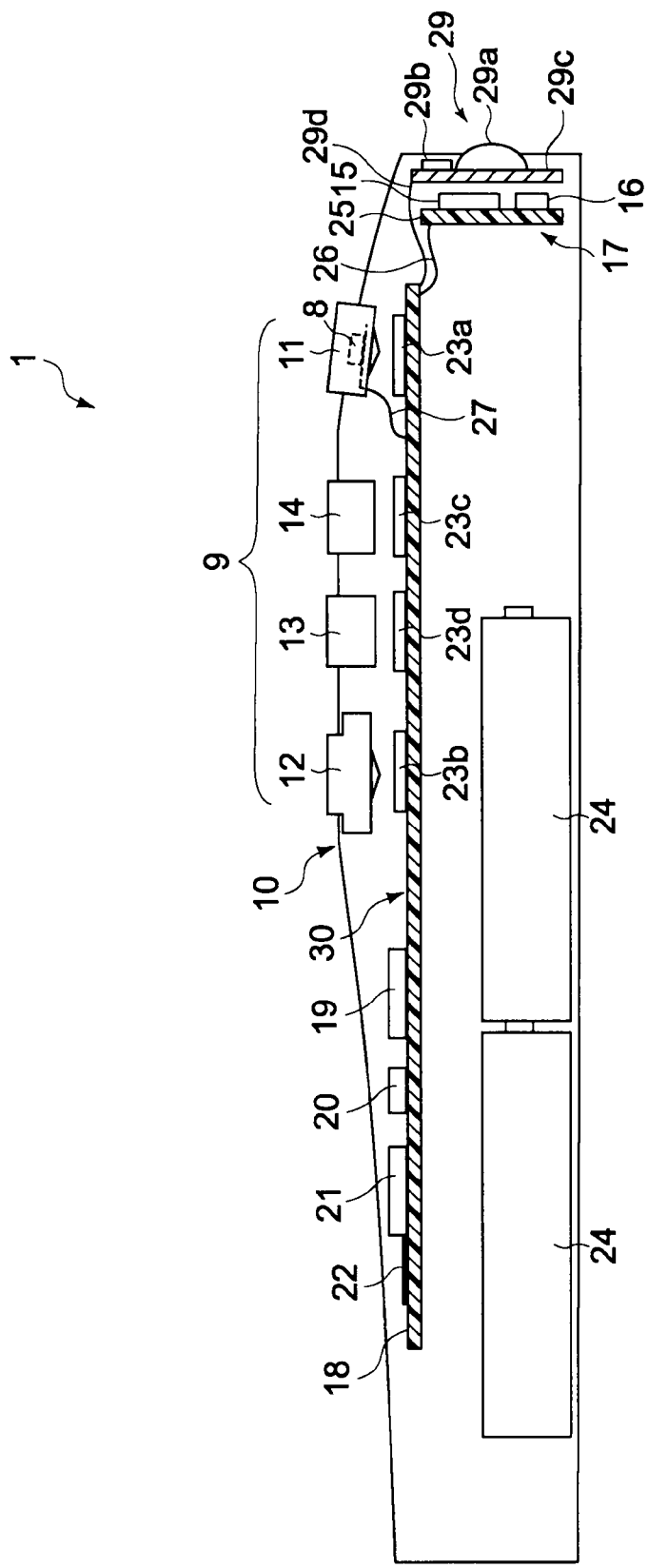
FIG. 3 is a diagram schematically showing an internal structure of the input apparatus.
Figure 4:
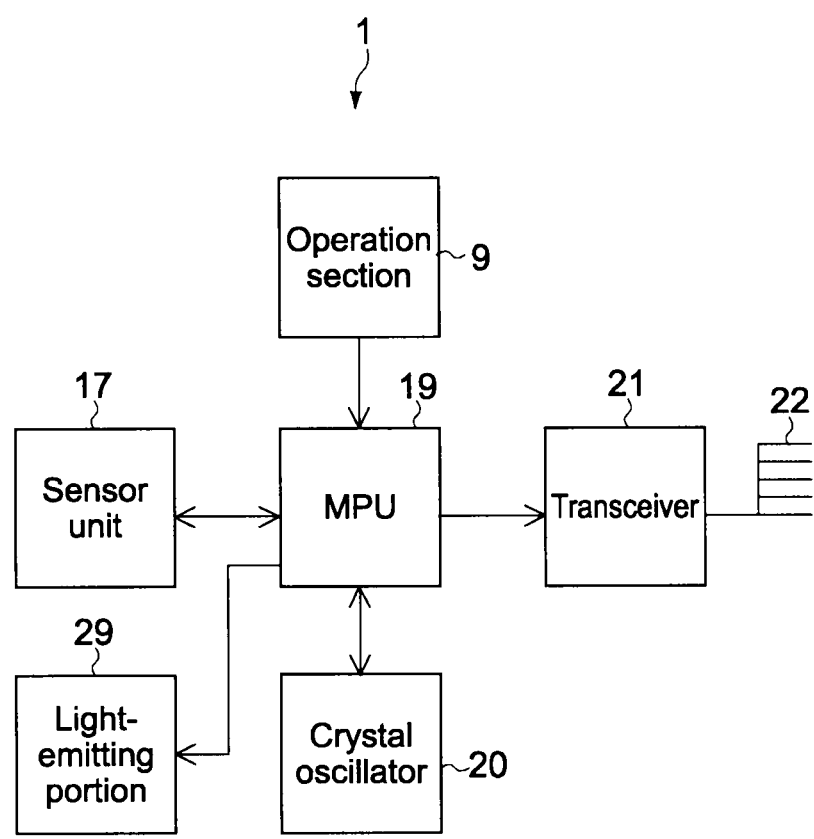
FIG. 4 is a block diagram showing an electrical structure of the input apparatus.

FIG. 3 is a diagram schematically showing an internal structure of the input apparatus 1. FIG. 4 is a block diagram showing an electrical structure of the input apparatus 1.

The input apparatus 1 includes a sensor unit 17, a control unit 30, batteries 24, and the light-emitting portion 29.

Figure 5:
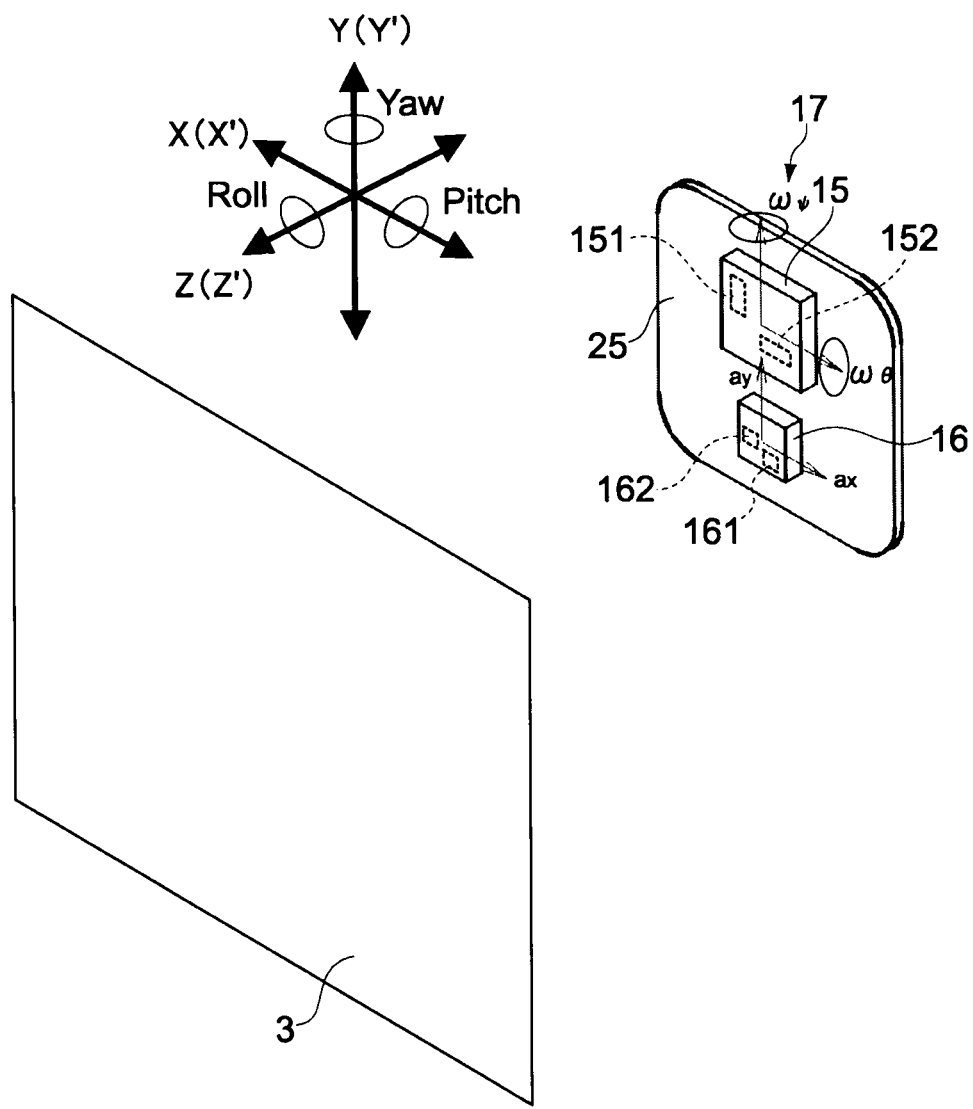
FIG. 5 is a diagram showing an example of a screen displayed on a display apparatus in the operation input system.

FIG. 5 is a perspective view showing the sensor unit 17.

It should be noted that in the specification, a coordinate system that moves along with the input apparatus 1, that is, a coordinate system fixed to the input apparatus 1 is expressed using an X' axis, Y' axis, and Z' axis, whereas a coordinate system stationary on earth, that is, an inertial coordinate system is expressed using an X axis, Y axis, and Z axis. In descriptions below, with regard to a movement of the input apparatus 1, a rotational direction about the X' axis is sometimes referred to as pitch direction, a rotational direction about the Y' axis is sometimes referred to as yaw direction, and a rotational direction about the Z' axis (roll axis) is sometimes referred to as roll direction.

The sensor unit 17 includes an angular velocity sensor unit 15 that detects angular velocities about the axes in different angles such as along two orthogonal axes (X' axis and Y' axis). Specifically, the angular velocity sensor unit 15 includes a first angular velocity sensor 151 and a second angular velocity sensor 152.

The sensor unit 17 also includes an acceleration sensor unit 16 that detects accelerations in directions along the two orthogonal axes. Specifically, the acceleration sensor unit 16 includes a first acceleration sensor 161 and a second acceleration sensor 162.

The angular velocity sensor unit 15 and the acceleration sensor unit 16 are packaged and mounted on a circuit board 25.

FIG. 5 shows a case where the angular velocity sensor unit 15 and the acceleration sensor unit 16 are mounted on one surface (front surface) of the circuit board 25. However, the present invention is not limited thereto, and the angular velocity sensor unit 15 and the acceleration sensor unit 16 may be mounted separately on respective surfaces of the circuit board. In this case, a size of the circuit board 25 can be reduced, with the result that rigidity of the circuit board 25 can be enhanced.

As each of the first angular velocity sensor 151 and the second angular velocity sensor 152, a vibration gyro sensor for detecting Coriolis force in proportion with an angular velocity is used. As each of the first acceleration sensor 161 and the second acceleration sensor 162, any sensor such as a piezoresistive sensor, a piezoelectric sensor, and a capacitance sensor may be used. The first angular velocity sensor 151 and the second angular velocity sensor 152 are not limited to the vibration gyro sensor, and a rotary top gyro sensor, a ring laser gyro sensor, a gas rate gyro sensor, a geomagnetic gyro sensor, and the like may be used instead.

In FIG. 3, a longitudinal direction of the casing 10 is referred to as Z'-axis direction, a width direction of the casing 10 is referred to as X'-axis direction, and a thickness direction of the casing 10 is referred to as Y'-axis direction. In this case, the sensor unit 17 is incorporated into the casing 10 such that a surface of the circuit board 25 on which the acceleration sensor unit 16 and the angular velocity sensor unit 15 are mounted becomes substantially parallel with an X'-Y' plane. With this structure, the sensor units 15 and 16 detect angular velocities and accelerations with respect to the X' axis and the Y' axis as described above.

Referring to FIGS. 3 and 4, the control unit 30 includes a main substrate 18, an MPU 19 (or CPU) mounted on the main substrate 18, a crystal oscillator 20, a transceiver 21, and an antenna 22 printed on the main substrate 18. The control unit 30 also includes, on the main substrate 18, switches 23a to 23d provided in correspondence with the buttons 11 to 14, respectively.

The main substrate 18 and the circuit board 25 are electrically connected to each other by flexible conductive wires 26 constituted of, for example, an FFC (Flexible Flat Cable). Moreover, the main substrate 18 and the optical sensor 8 are electrically connected to each other by a flexible substrate 27 constituted of, for example, an FPC (Flexible Printed Circuit).

The MPU 19 includes a built-in volatile or nonvolatile memory. The MPU 19 is input with a detection signal from the sensor unit 17, an operation signal from the operation section (including light reception signal from optical sensor 8), and the like, and executes various kinds of operational processing in order to generate predetermined control signals in response to those input signals. The memory may be provided separate from the MPU 19.

Typically, the sensor unit 17 outputs analog signals. In this case, the MPU 19 includes an A/D (Analog/Digital) converter. Alternatively, the sensor unit 17 may be a unit that includes the A/D converter.

The transceiver 21 transmits, as RF radio signals, the control signals generated by the MPU 19 to the control apparatus 40 via the antenna 22. The transceiver 21 is also capable of receiving various signals transmitted from the control apparatus 40.

The crystal oscillator 20 generates clocks and supplies them to the MPU 19. As the batteries 24, dry cell batteries, rechargeable batteries, and the like are used.

The light-emitting portion 29 includes a light-emitting device 29a, a drive portion 29b for driving the light-emitting device 29a, and a substrate 29c on which the light-emitting device 29a and the drive portion 29b are mounted. The substrate 29c is electrically connected to the main substrate 18 by a flexible substrate 29d constituted of, for example, an FFC (Flexible Flat Cable).

Referring back to FIG. 1, the control apparatus 40 includes an MPU 35, a RAM 36, a ROM 37, a video RAM 41, a display control section 42, an antenna 39, and a transceiver 38.

The transceiver 38 receives the control signals transmitted from the input apparatus 1 via the antenna 39.

The transceiver 38 is also capable transmitting various predetermined signals to the input apparatus 1. The MPU 35 executes various kinds of operational processing based on the control signals. The display control section 42 mainly generates screen data to be displayed on the screen 3 of the display apparatus 5 under control of the MPU 35. The video RAM 41 as a work area of the display control section 42 temporarily stores the generated screen data.

The control apparatus 40 may be an apparatus dedicated to the input apparatus 1, or may be a PC or the like. The control apparatus 40 is not limited to an apparatus dedicated to the input apparatus 1 and may be a computer integrally formed with the display apparatus 5, audiovisual equipment, a projector, a game device, a car navigation system, or the like.

Next, a description will be given on typical examples of ways of moving the input apparatus 1 and ways the pointer 2 moves on the screen 3 accordingly. FIG. 6 are explanatory diagrams therefor.

Figure 6A:
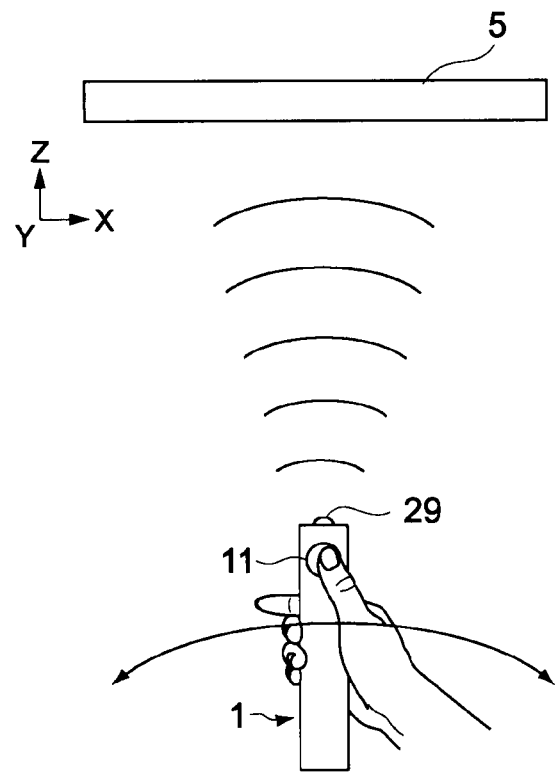
FIG. 6 are diagrams showing a state where a user is holding the input apparatus.
Figure 6B:
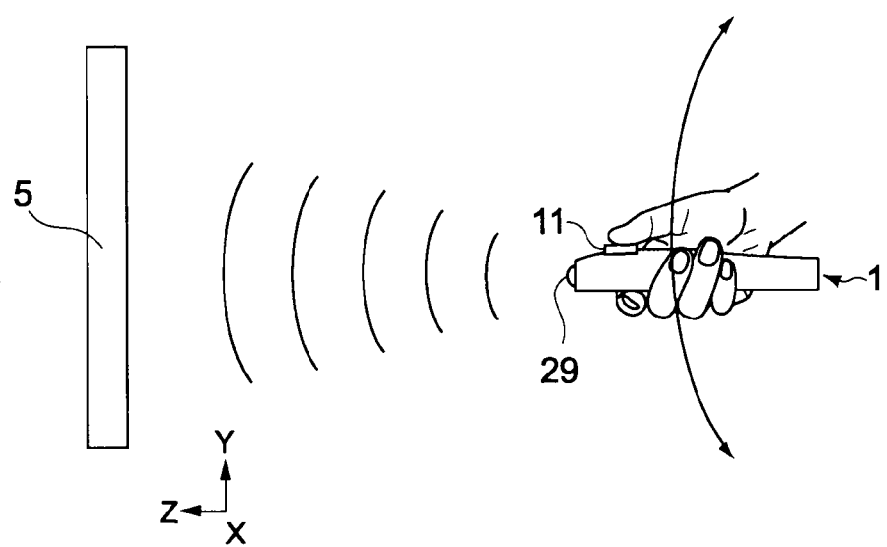

As shown in FIGS. 6A and 6B, the user holds the input apparatus 1 with a thumb on top and aims a tip end side of the input apparatus 1 at the display apparatus 5.

In this state, the circuit board 25 of the sensor unit 17 (see FIG. 5) is close to being in parallel with the screen 3 of the display apparatus 5, and the two axes as detection axes of the sensor unit 17 respectively correspond to a horizontal axis (X axis) and a vertical axis (Y axis) of the screen 3. Hereinafter, the position of the input apparatus 1 as shown in FIGS. 6A and 6B will be referred to as reference position.

The user places a thumb above the button 11 in the reference position so that the pointer 2 becomes movable.

As shown in FIG. 6A, in the reference position, the user swings a wrist or an arm in the lateral direction, that is, the yaw direction. At this time, the first acceleration sensor 161 detects an acceleration $a_x$ in the X'-axis direction, and the first angular velocity sensor 151 detects an angular velocity $\omega_\psi$ about the Y' axis. Based on those detection values, the operation input system 100 controls display of the pointer 2 so that the pointer 2 moves in the horizontal-axis direction on the screen 3.

Meanwhile, as shown in FIG. 6B, in the reference position, the user swings a wrist or an arm in the vertical direction, that is, the pitch direction. At this time, the second acceleration sensor 162 detects an acceleration $a_y$ in the Y'-axis direction, and the second angular velocity sensor 152 detects an angular velocity $\omega_\theta$ about the X' axis. Based on those detection values, the operation input system 100 controls display of the pointer 2 so that the pointer 2 moves in the vertical-axis direction on the screen 3.

Next, descriptions will be given on an operation of the operation input system 100 of this embodiment.

(Typical Operation)

First, a typical operation of the operation input system 100 will be described. It should be noted that as the typical operation, a case where the movement of the pointer 2 is controlled based on outputs of the angular velocity sensor unit 15 will be described.

When power of the input apparatus 1 is turned on by the user pressing a power supply switch 28, for example, biaxial angular velocity signals are output from the angular velocity sensor unit 15. The MPU 19 obtains the angular velocity signals as angular velocity values ($\omega_\psi$, $\omega_\theta$). After that, the MPU 19 transmits the angular velocity values ($\omega_\psi$, $\omega_\theta$) to the control apparatus 40 via the transceiver 21 and the antenna 22. The control apparatus 40 receives the angular velocity values ($\omega_\psi$, $\omega_\theta$) transmitted from the input apparatus 1 via the transceiver 38 and the antenna 39. The MPU 35 of the control apparatus 40 calculates biaxial velocity values ($V_x$, $V_y$) based on the received angular velocity values ($\omega_\psi$, $\omega_\theta$). Here, the velocity value $V_x$ is a velocity value in a direction along the X' axis and the velocity value $V_y$ is a velocity value in a direction along the Y' axis.

Upon receiving the velocity values, the MPU 35 of the control apparatus 40 adds the velocity values to coordinate values, respectively, using Equations (1) and (2) below, to thus generate new coordinate values (X(t), Y(t)). The MPU 35 controls display on the screen such that the pointer 2 moves to a position corresponding to the generated coordinate values.

$$X(t)=X(t-1)+V_x \quad (1)$$

$$Y(t)=Y(t-1)+V_y \quad (2)$$

As another method of calculating the velocity values ($V_x$, $V_y$), there is the following method. The MPU 35 calculates radius gyrations ($R_\psi$, $R_\theta$) of the movement of the input apparatus 1 by dividing the acceleration values ($a_x$, $a_y$) by angular acceleration values ($\Delta\omega_\psi$, $\Delta\omega_\theta$). In this case, the MPU 35 calculates the velocity values ($V_x$, $V_y$) by multiplying the radius gyrations ($R_\psi$, $R_\theta$) by the angular velocity values ($\omega_\psi$, $\omega_\theta$). The radius gyrations ($R_\psi$, $R_\theta$) may also be calculated by dividing acceleration change rates ($La_x$, $La_y$) by angular acceleration change rates ($\Delta(\Delta\omega^\psi)$, $\Delta(\Delta\omega_\theta)$).

(Detection of Sensor Output)

In the input apparatus 1 of this embodiment, the sensor unit 17 that includes the angular velocity sensors (angular velocity sensor unit 15) and the acceleration sensors (acceleration sensor unit 16) and detects inertial amounts by a temporally-differentiated displacement dimension of an angular velocity, an acceleration, and the like instead of directly detecting the displacements is used. The inertial sensors each output a potential fluctuation with respect to a reference potential, that corresponds to the movement of the casing 10, as a detection signal.

Hereinafter, an example of an angular velocity detection method will be described while taking the angular velocity sensor as an example.

Figure 7A:
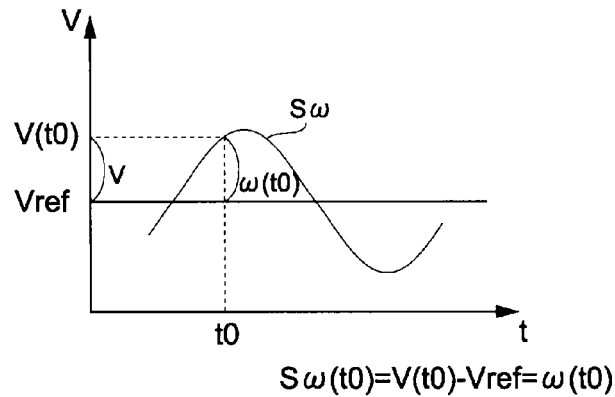
FIG. 7 are diagrams for explaining typical examples of ways of moving the input apparatus and ways a pointer moves on a screen.

FIG. 7A shows an example of an output of the angular velocity sensor. Here, the output of the angular velocity sensor includes a DC offset Vref corresponding to the reference potential. Therefore, a value obtained by subtracting the DC offset Vref from an output V(t0) of the angular velocity sensor becomes an effective value (angular velocity value) $\omega$(t0) of an angular velocity signal detected by the angular velocity sensor.

Figure 7B:
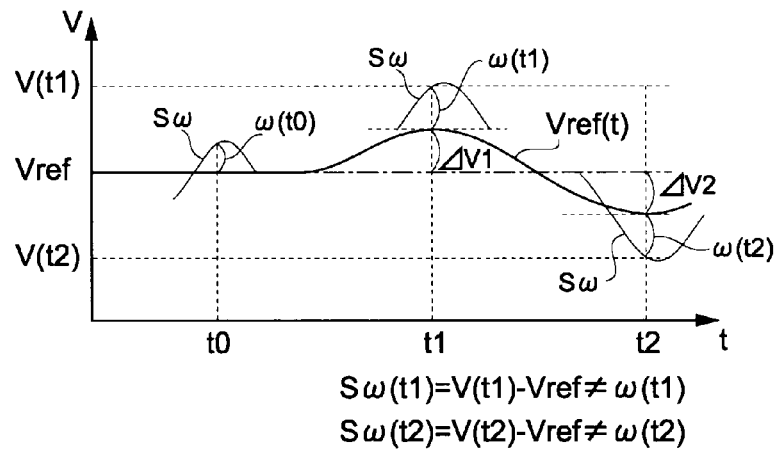
Figure 7C:
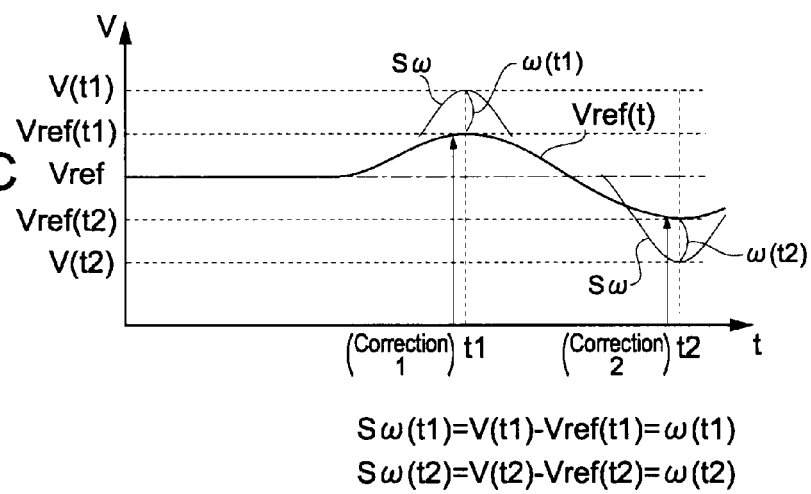

The DC offset fluctuates based on device characteristics constituting the sensor (temperature drift, change in vibration mode, etc.), an external stress, and circuit characteristics of an analog circuit (temperature characteristics, time constant, SN ratio of amplifier output, etc.), and a transition of the fluctuation is not uniform. FIG. 7B shows an example of a fluctuation of the DC offset Vref.

When the DC offset Vref fluctuates, a deviation is caused in a calculation of the angular velocity value $\omega$(t0).

For example, when the DC offset at a time t0 is represented by Vref(t0) in the example of FIG. 7B, a DC offset Vref(t1) at a time t1 becomes Vref(t0)+$\Delta$V1 and a DC offset Vref(t2) at a time t2 becomes Vref(t0)−$\Delta$V2. Thus, there is an error of $\Delta$V1+$\Delta$V2 between an angular velocity value $\omega$(t1) at the time t1 and an angular velocity value $\omega$(t2) at the time t2. In this case, not only an operational feeling of the input apparatus 1 deteriorates, but also the pointer moves on the screen even when the input apparatus 1 is still.

(DC Offset Correction Processing)

In this regard, in this embodiment, a DC offset is corrected by the processing as follows.

In short, the DC offset correction processing of this embodiment is as follows. The control apparatus 40 detects a movement of the input apparatus 1 based on an image obtained by the camera section 51 and judges that the input apparatus 1 is in a "static" state when a displacement amount of the movement of the input apparatus 1 is a predetermined value or less. When judged that the input apparatus 1 is in the "static" state, the control apparatus 40 corrects a DC offset by a mean value of angular velocity values obtained from the input apparatus 1.

Figure 8:
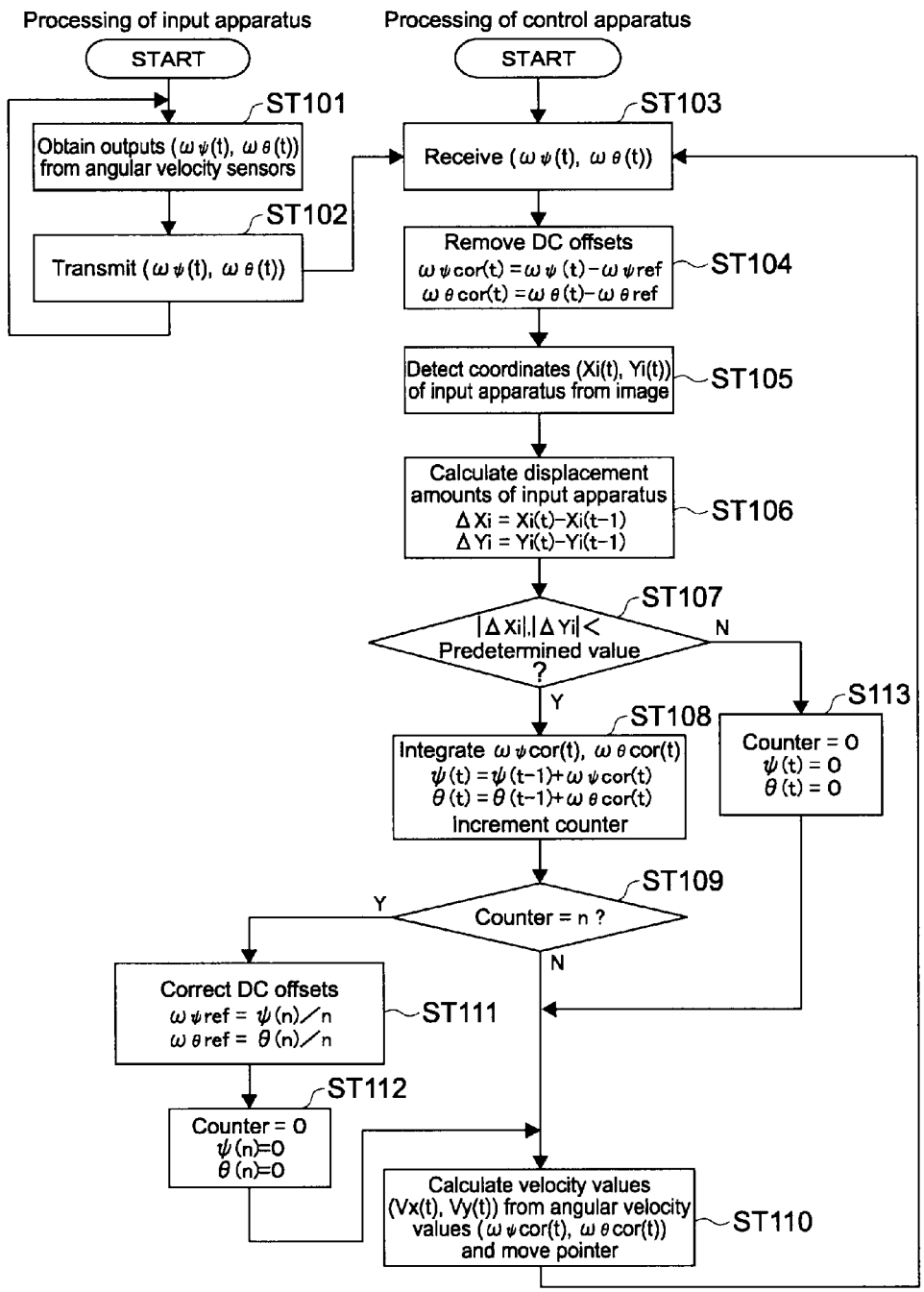
FIG. 8 is a flowchart of DC offset correction processing according to the first embodiment of the present invention.

FIG. 8 is a flowchart of the DC offset correction processing of this embodiment. Hereinafter, the DC offset correction processing of this embodiment will be described in detail along with the flowchart of FIG. 8.

The MPU 19 of the input apparatus 1 obtains biaxial angular velocity signals ($\omega_\psi$(t), $\omega_\theta$(t)) from the angular velocity sensor unit 15 in a predetermined cycle (Step 101) and transmits the signals to the control apparatus 40 via the transceiver 21 and the antenna 22 (Step 102).

The control apparatus 40 receives the biaxial angular velocity signals ($\omega_\psi$(t), $\omega_\theta$(t)) from the input apparatus 1 (Step 103). The MPU 35 of the control apparatus 40 obtains biaxial angular velocity values ($\omega_\psi$cor(t), $\omega_\theta$cor(t)) by subtracting DC offsets ($\omega_\psi$ref, $\omega_\theta$ref) in the axial directions from the received biaxial angular velocity signals ($\omega_\psi$(t), $\omega_\theta$(t)), respectively (Step 104).

Next, the MPU 35 of the control apparatus 40 detects coordinates (Xi(t), Yi(t)) of the input apparatus 1 within a camera field angle from an image taken by the camera section 51 (Step 105) and calculates differences between the detected result and coordinates (Xi(t−1), Yi(t−1)) detected in the last cycle as displacement amounts ($\Delta$Xi, $\Delta$Yi) of the input apparatus 1 in the biaxial directions (Step 106).

Next, the MPU 35 of the control apparatus 40 judges whether absolute values of the calculated displacement amounts ($\Delta$Xi, $\Delta$Yi) are larger than a predetermined value (Step 107). Here, in the comparison between the absolute values of the displacement amounts ($\Delta$Xi, $\Delta$Yi) and the predetermined value, the absolute values are judged to be "large" when at least one of ΔXi and ΔYi is larger than the predetermined value and judged to be "small" when both of ΔXi and ΔYi are smaller than the predetermined value.

When judged as being "small", the MPU 35 of the control apparatus 40 judges that the input apparatus 1 is in the "static" state. Then, the MPU 35 uses the angular velocity values ($\omega_\psi$cor(t), $\omega_\theta$cor(t)) obtained in the current cycle to calculate rotational angles ($\psi$(t), $\theta$(t)) using Equations (3) and (4) below.

$$\psi(t)=\psi(t-1)+\omega_\psi cor(t) \quad (3)$$

$$\theta(t)=\theta(t-1)+\omega_\theta cor(t) \quad (4)$$

After calculating the rotational angles ($\psi$(t), $\theta$(t)), the MPU 35 increments a counter holding a calculation count of the rotational angles ($\psi$(t), $\theta$(t)) (Step 108). Then, the MPU 35 judges whether a value of the counter after the increment has reached a predetermined value (n) (Step 109), and when judged no (NO in Step 109), calculates velocity values ($V_x$(t), $V_y$(t)) based on the angular velocity values ($\omega_\psi$cor(t), $\omega_\theta$cor(t)). Using Equations (1) and (2), the MPU 35 adds the velocity values ($V_x$(t), $V_y$(t)) to the coordinate values (X(t-1), Y(t-1)) to generate new coordinate values (X(t), Y(t)) and controls display on the screen 3 so that the pointer 2 moves to a position corresponding to the coordinate values (X(t), Y(t)) (Step 110).

On the other hand, when judging that the value of the counter after the increment has reached the predetermined value (n), that is, an integration count of the angular velocity values ($\omega_\psi$cor(t), $\omega_\theta$cor(t)) has reached the predetermined value (n) (YES in Step 109), the MPU 35 carries out processing as follows. The MPU 35 calculates a mean value of the angular velocity values ($\omega_\psi$cor(t), $\omega_\theta$cor(t)) by dividing the rotational angles ($\psi$(t), $\theta$(t)) obtained up to this time point by the predetermined value (n) and corrects the DC offsets ($\omega_\psi$ref, $\omega_\theta$ref) by the calculated mean value (Step 111). After that, the MPU 35 resets the counter and also the rotational angles ($\psi$(n), $\theta$(n)) (Step 112). Then, the MPU 35 calculates velocity values ($V_x$(t), $V_y$(t)) based on the angular velocity values ($\omega_\psi$cor(t), $\omega_\theta$cor(t)) and adds the velocity values ($V_x$(t), $V_y$(t)) to the coordinate values (X(t-1), Y(t-1)) to thus generate new coordinate values (X(t), Y(t)), and then controls display on the screen 3 so that the pointer 2 moves to a position corresponding to the coordinate values (X(t), Y(t)) (Step 110).

The operation described above is an operation that is carried out when it is judged in Step 107 that the absolute values of the displacement amounts (ΔXi, ΔYi) are small, that is, the "static" state is consecutively judged a predetermined number of times (n times).

When judged in Step 107 that the absolute values of the displacement amounts (ΔXi, ΔYi) are larger than the predetermined value, the MPU 35 assumes that the input apparatus 1 is in an "operated" state and resets the counter and the rotational angles ($\psi$(t), $\theta$(t)) (Step 113).

Accordingly, the DC offsets ($\omega_\psi$ref, $\omega_\theta$ref) are corrected only when the "static" state where the displacement amounts (ΔXi, ΔYi) are small is consecutively judged a predetermined number of times (n times).

As described above, according to this embodiment, the MPU 35 of the control apparatus 40 calculates the displacement amounts of the input apparatus 1 based on the coordinates (Xi(t), Yi(t)) of the input apparatus 1 detected based on the image taken by the camera section 51. The MPU 35 judges whether the input apparatus 1 is in the "static" state by the displacement amounts and corrects the DC offsets ($\omega_\psi$ref, $\omega_\theta$ref) using the mean value of the angular velocity values ($\omega_\psi$cor(t), $\omega_\theta$cor(t)) obtained at the time the input apparatus 1 is in the "static" state. Accordingly, favorable angular velocity values ($\omega_\psi$cor(t), $\omega_\theta$cor(t)) can be obtained even when the DC offsets fluctuate, and an operation of the pointer 2 that matches an operational feeling of the user becomes possible.

It should be noted that the series of processes shown in the flowchart of FIG. 8 may all be carried out in the input apparatus 1.

Modified Example 1

Modified Example of DC Offset Correction Processing

The above embodiment has described a case where the DC offset is corrected when the "static" state continues for a predetermined period of time. However, it is also possible to correct sensitivities of the angular velocity sensors 151 and 152 of the angular velocity sensor unit 15 of the input apparatus 1 instead of correcting a DC offset.

Modified Example 2

Modified Example of DC Offset Correction Processing

An update of the DC offset by the DC offset correction processing according to the first embodiment is carried out while the input apparatus 1 is in the "static" state, whereas in Modified Example 2, the DC offset correction is carried out constantly irrespective of the state ("static" or "operated" state) of the input apparatus 1.

Figure 9:
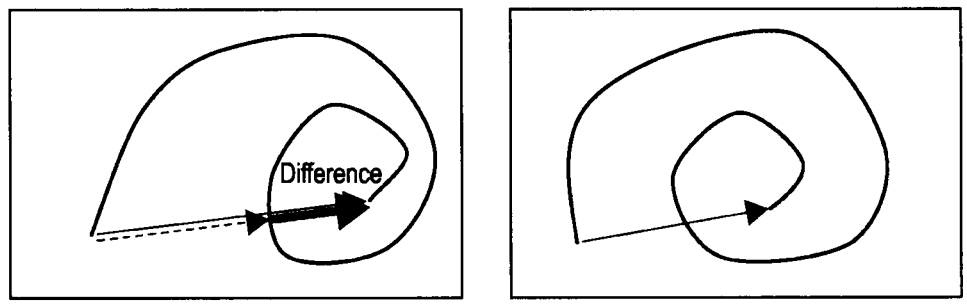
FIG. 9 is a diagram showing an example of a trajectory of coordinates that are based on angular velocity values and a trajectory of coordinates that are based on an image in a case where there is a fluctuation in the DC offset.

FIG. 9 is a diagram showing an example of a trajectory of coordinates that are based on angular velocity values and a trajectory of coordinates that are based on an image in a case where there is a fluctuation in the DC offset. As shown in the figure, a difference due to a fluctuation of a DC offset is caused between the coordinates that are based on angular velocity values and the coordinates that are based on an image. In this regard, in Modified Example 2, the DC offset is corrected based on a difference between a displacement amount of the coordinates that are based on angular velocity values and a displacement amount of the coordinates that are based on an image, that are obtained every time a predetermined time passes.

Figure 10:
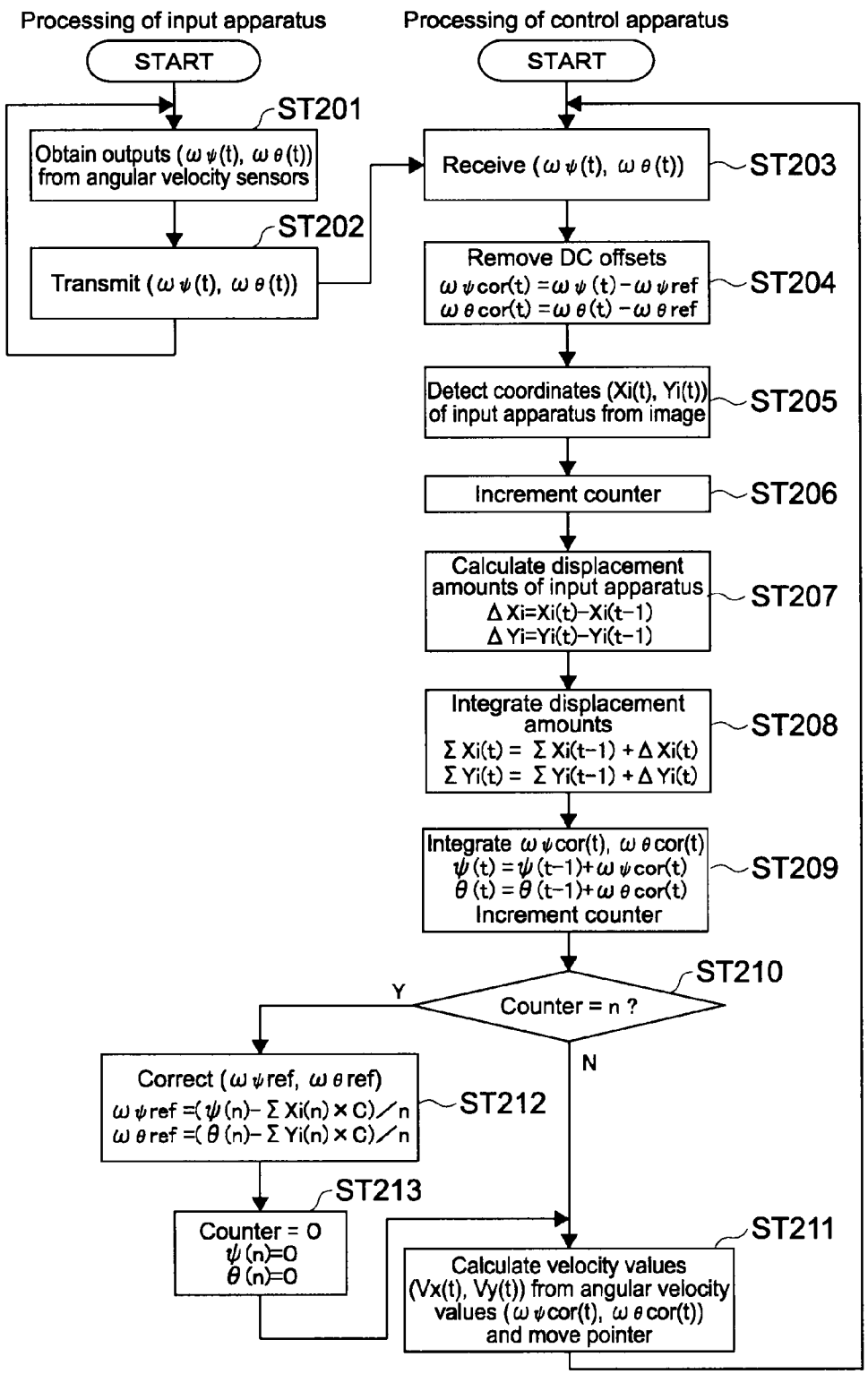
FIG. 10 is a flowchart of the DC offset correction processing according to Modified Example 2 of the first embodiment of the present invention.

FIG. 10 is a flowchart of the DC offset correction processing according to Modified Example 2. Hereinafter, the DC offset correction processing according to Modified Example 2 will be described in detail along with the flowchart of FIG. 10.

The MPU 19 of the input apparatus 1 obtains biaxial angular velocity signals ($\omega_\psi$(t), $\omega_\theta$(t)) from the angular velocity sensor unit 15 in a predetermined cycle (Step 201) and transmits the signals to the control apparatus 40 via the transceiver 21 and the antenna 22 (Step 202).

The control apparatus 40 receives the biaxial angular velocity signals ($\omega_\psi$(t), $\omega_\theta$(t)) from the input apparatus 1 (Step 203). The MPU 35 of the control apparatus 40 obtains biaxial angular velocity values ($\omega_\psi$cor(t), $\omega_\theta$cor(t)) by subtracting DC offsets ($\omega_\psi$ref, $\omega_\theta$ref) in the biaxial directions from the received biaxial angular velocity signals ($\omega_\psi$(t), $\omega_\theta$(t)), respectively (Step 204).

Next, the MPU 35 of the control apparatus 40 detects coordinates (Xi(t), Yi(t)) of the input apparatus 1 within a camera field angle from an image taken by the camera section 51 (Step 205) and increments a counter (Step 206). Next, the MPU 35 of the control apparatus 40 calculates differences between the coordinates (Xi(t), Yi(t)) detected in Step 205 and coordinates (Xi(t−1), Yi(t−1)) detected in the last cycle as displacement amounts (ΔXi, ΔYi) of the input apparatus 1 in the biaxial directions (Step 207).

Next, the MPU 35 of the control apparatus 40 integrates the displacement amounts (ΔXi, ΔYi) using Equations (5) and (6) below. Accordingly, integration values (ΣXi(t), ΣYi(t)) of the displacement amounts of the coordinates that are based on an image are obtained (Step 208).

$$\Sigma Xi(t)=\Sigma Xi(t-1)+\Delta Xi(t) \quad (5)$$

$$\Sigma Yi(t)=\Sigma Yi(t-1)+\Delta Yi(t) \quad (6)$$

Next, the MPU 35 calculates rotational angles (ψ(t), θ(t)) from the angular velocity values (ω$_\psi$cor(t), ω$_\theta$cor(t)) obtained in the current cycle using Equations (3) and (4) above. After calculating the rotational angles (ψ(t), θ(t)), the MPU 35 increments the counter again (Step 209).

Then, the MPU 35 judges whether a value of the counter after the increment has reached a predetermined value (n) (Step 210), and when judged no (NO in Step 210), calculates velocity values (V$_x$(t), V$_y$(t)) based on the angular velocity values (ω$_\psi$cor(t), ω$_\theta$cor(t)). Using Equations (1) and (2), the MPU 35 adds the calculated velocity values (V$_x$(t), V$_y$(t)) to the coordinate values (X(t−1), Y(t−1)) to generate new coordinate values (X(t), Y(t)) and controls display on the screen 3 so that the pointer 2 moves to a position corresponding to the coordinate values (X(t), Y(t)) (Step 211).

On the other hand, when judging that the value of the counter after the increment has reached a predetermined upper limit value (YES in Step 210), the MPU 35 corrects the DC offsets (ω$_\psi$ref, ω$_\theta$ref) using Equations (7) and (8) below (Step 212).

$$\omega_\psi ref = (\psi(n) - Xi(n)*C)/n \quad (7)$$

$$\omega_\theta ref = (\theta(n) - Yi(n)*C)/n \quad (8)$$

C used herein is a predetermined proportional constant used for adjusting the integration values (ΣXi(t), ΣYi(t)) of the displacement amounts of the coordinates that are based on an image to values corresponding to the rotational angles.

After that, the MPU 35 resets the counter and also the rotational angles (ψ(n), θ(n)) (Step 213). Then, the MPU 35 calculates velocity values (V$_x$(t), V$_y$(t)) based on the angular velocity values (ω$_\psi$cor(t), ω$_\theta$cor(t)) and adds the velocity values (V$_x$(t), V$_y$(t)) to the coordinate values (X(t−1), Y(t−1)) to thus generate new coordinate values (X(t), Y(t)), and then controls display on the screen 3 so that the pointer 2 moves to a position corresponding to the coordinate values (X(t), Y(t)) (Step 211).

As described above, according to this embodiment, the MPU 35 of the control apparatus 40 corrects the DC offsets based on the difference between the displacement amounts of the coordinates that are based on angular velocity values and the displacement amounts of the coordinates that are based on an image, that are obtained every time a predetermined time passes. Accordingly, it becomes possible to constantly carry out the DC offset correction, obtain favorable angular velocity values (ω$_\psi$cor(t), ω$_\theta$cor(t)) even when the DC offsets fluctuate, and enable an operation of the pointer 2 that matches an operational feeling of the user to be made.

It should be noted that the series of processes shown in the flowchart of FIG. 10 may all be carried out in the input apparatus 1.

Second Embodiment (Roll Tilt Correction)

Figure 11:
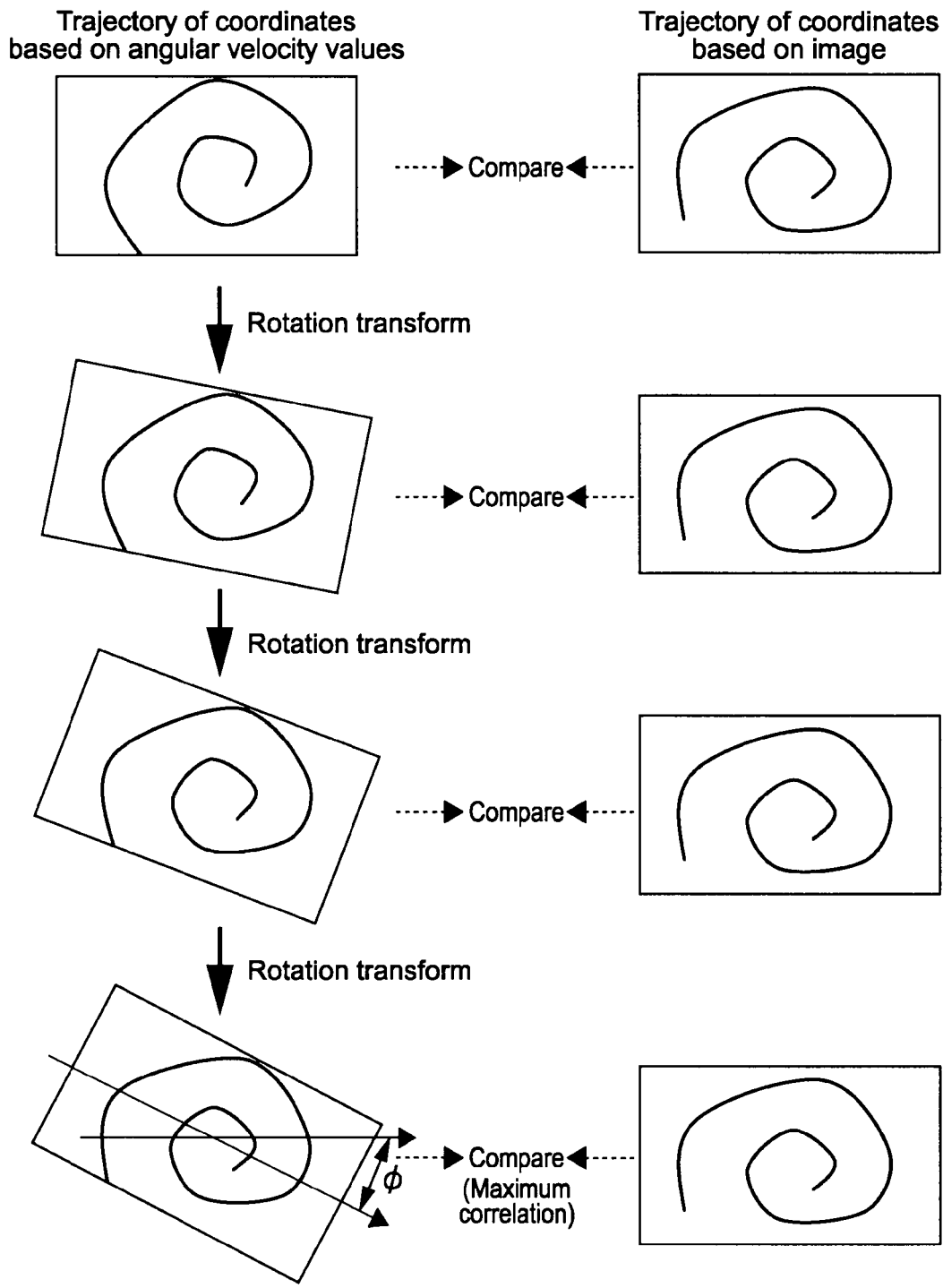
FIG. 11 is a diagram showing an example of a trajectory of coordinates that are based on angular velocity values and a trajectory of coordinates that are based on an image in a case where the input apparatus is operated while being tilted in a roll direction.

FIG. 11 is a diagram showing an example of a trajectory of coordinates that are based on angular velocity values and a trajectory of coordinates that are based on an image in a case where the input apparatus 1 is operated while being tilted in the roll direction. As shown in the figure, the trajectory of coordinates that are based on angular velocity values obtained when the input apparatus 1 is operated while being tilted in the roll direction is obtained by turning the trajectory of coordinates that are based on an image only by an angle φ (roll angle) within a camera field angle.

In this regard, the control apparatus 40 according to the second embodiment compares the trajectory of coordinates that are based on an image and the trajectory of coordinates that are based on angular velocity values while performing a relative rotation transform, judges a rotational angle with which a highest correlation is obtained as a roll angle φ of the input apparatus 1, and uses the roll angle φ to correct the angular velocity values.

Figure 12:
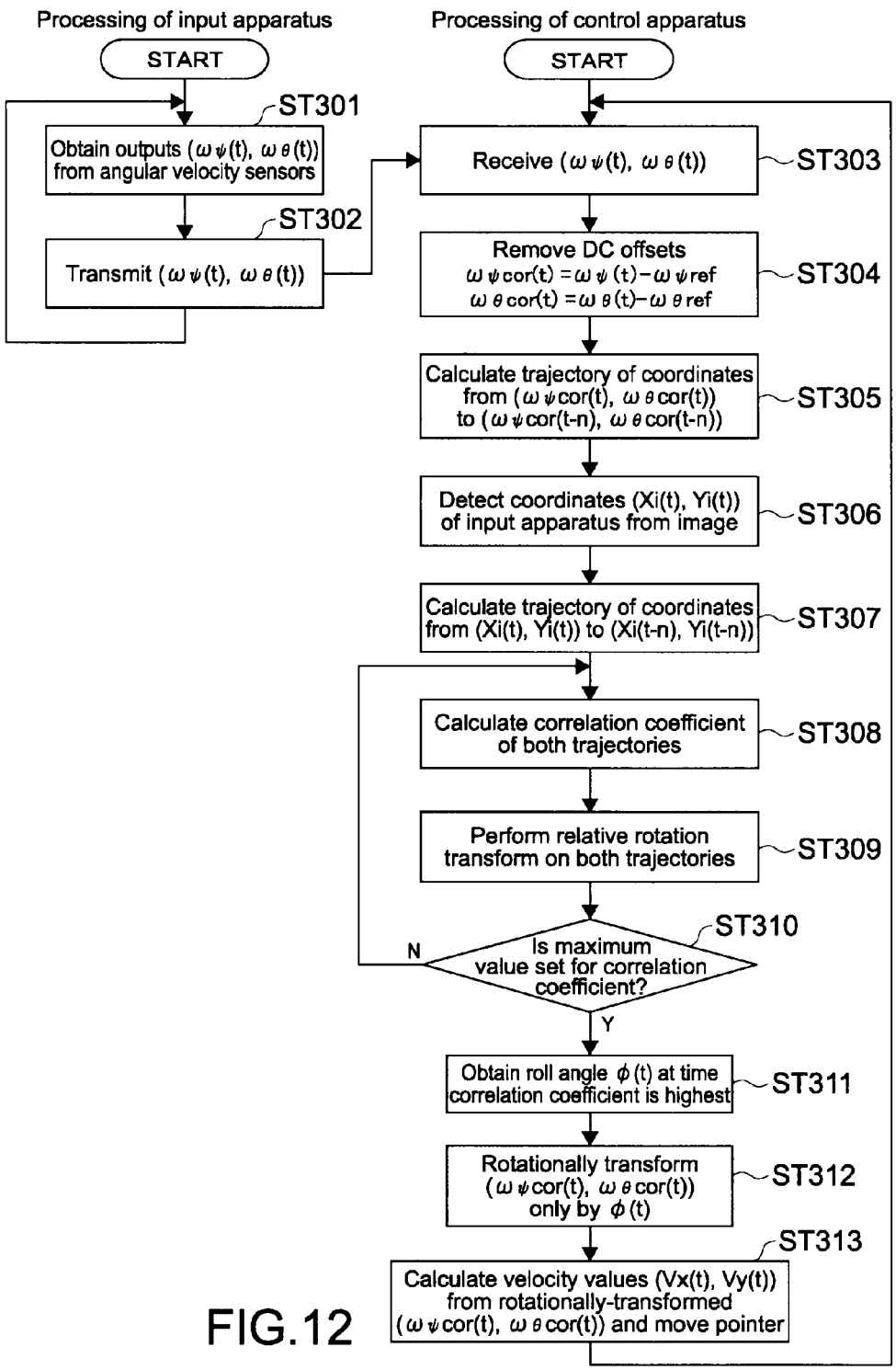
FIG. 12 is a flowchart of roll tilt correction processing according to a second embodiment of the present invention.

FIG. 12 is a flowchart of roll tilt correction processing according to the second embodiment. Hereinafter, the roll tilt correction processing according to the second embodiment will be described in detail along with the flowchart of FIG. 12.

Here, operations from Steps 301 to 304 are the same as those of Steps 101 to 104 of the DC offset correction processing according to the first embodiment.

In Step 305, the MPU 35 of the control apparatus 40 obtains a trajectory of coordinates from currently-obtained angular velocity values (ω$_\psi$cor(t), ω$_\theta$cor(t)) to angular velocity values (ω$_\psi$cor(t−n), ω$_\theta$cor(t−n)) obtained n cycles before the current cycle (Step 305).

Next, the MPU 35 detects coordinates (Xi(t), Yi(t)) of the input apparatus 1 within the camera field angle from an image taken by the camera section 51 (Step 306). Then, the MPU 35 obtains a trajectory from the currently-obtained coordinates (Xi(t), Yi(t)) to coordinates (Xi(t−n), Yi(t−n)) obtained n cycles before the current cycle (Step 307).

Next, the MPU 35 repetitively compares the trajectory of coordinates that are based on angular velocity values and the trajectory of coordinates that are based on an image while performing a relative rotation transform and judges a rotational angle with which a highest correlation is obtained as a roll angle φ of the input apparatus 1 (Steps 308 to 311).

Subsequently, the MPU 35 rotationally transforms the angular velocity values (ω$_\psi$cor(t), ω$_\theta$cor(t)) only by the roll angle φ (Step 312) and calculates velocity values (V$_x$(t), V$_y$(t)) from the rotationally-transformed angular velocity values. The MPU 35 generates new coordinate values (X(t), Y(t)) using the calculated velocity values (V$_x$(t), V$_y$(t)) and controls display on the screen 3 so that the pointer 2 moves to a position corresponding to the coordinate values (X(t), Y(t)) (Step 313).

As described above, the MPU 35 of the control apparatus 40 according to the second embodiment compares the trajectory of coordinates that are based on an image and the trajectory of coordinates that are based on angular velocity values while performing a relative rotation transform and judges a rotational angle with which a highest correlation is obtained as a roll angle φ of the input apparatus 1. The MPU 35 rotationally transforms the angular velocity values by the roll angle φ. As a result, the roll tilt of the input apparatus 1 can be corrected favorably.

It is also possible to perform the correction by obtaining a roll angle φ of the input apparatus 1 based on gravity accelerations detected by the acceleration sensors. However, since the outputs of the acceleration sensors contain inertial acceleration components, an extremely-complicated operation is required for removing the inertial acceleration components. The roll tilt correction processing according to the second embodiment has an advantage that an operation is simpler than in a case where gravity accelerations detected by the acceleration sensors are used.

Here, the rotational transform of the angular velocity values based on the roll angle φ can be carried out using a rotation matrix as shown in Equation (9) below.

$$\begin{pmatrix} \omega\psi r \\ \omega\theta r \end{pmatrix} = \begin{pmatrix} \cos\phi & -\sin\phi \\ \sin\phi & \cos\phi \end{pmatrix} \begin{pmatrix} \omega\psi cor(t) \\ \omega\theta cor(t) \end{pmatrix} \quad (9)$$

Modified Example 3

Modified Example of Roll Tilt Correction

Although the method of obtaining a roll angle φ by comparing a trajectory of coordinates that are based on an image and a trajectory of coordinates that are based on angular velocity values has been described above, it is also possible to obtain a roll angle φ by comparing differential values between a trajectory of coordinates that are based on an image and a trajectory of coordinates that are based on angular velocity values.

Modified Example 4

Modified Example of Roll Tilt correction

Next, a method of correcting a roll tilt on the input apparatus 1 side will be described.

Figure 13:
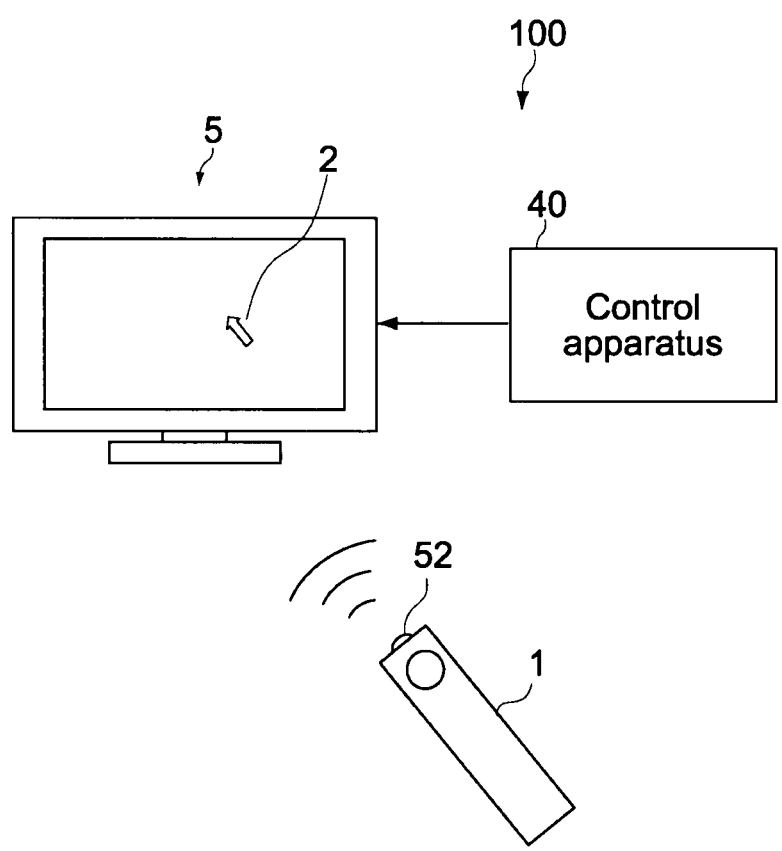
FIG. 13 is a schematic structural diagram showing the operation input system according to Modified Example 4 of the second embodiment of the present invention.

As shown in FIG. 13, Modified Example 4 is different from the above embodiments in that at least a camera section 52 is provided in the input apparatus 1 in place of the light-emitting portion 29 (see FIG. 1). The camera section 52 is provided at a tip end portion of the input apparatus 1 so that the display apparatus 5 fits in a field angle, for example.

The input apparatus 1 of Modified Example 4 extracts a linear component to be a reference axis from an image including the display apparatus 5 or the like taken by the camera section 52 and obtains a roll angle φ of the input apparatus 1 with respect to the reference axis. The input apparatus 1 uses the roll angle φ to correct angular velocity values.

Figure 14:
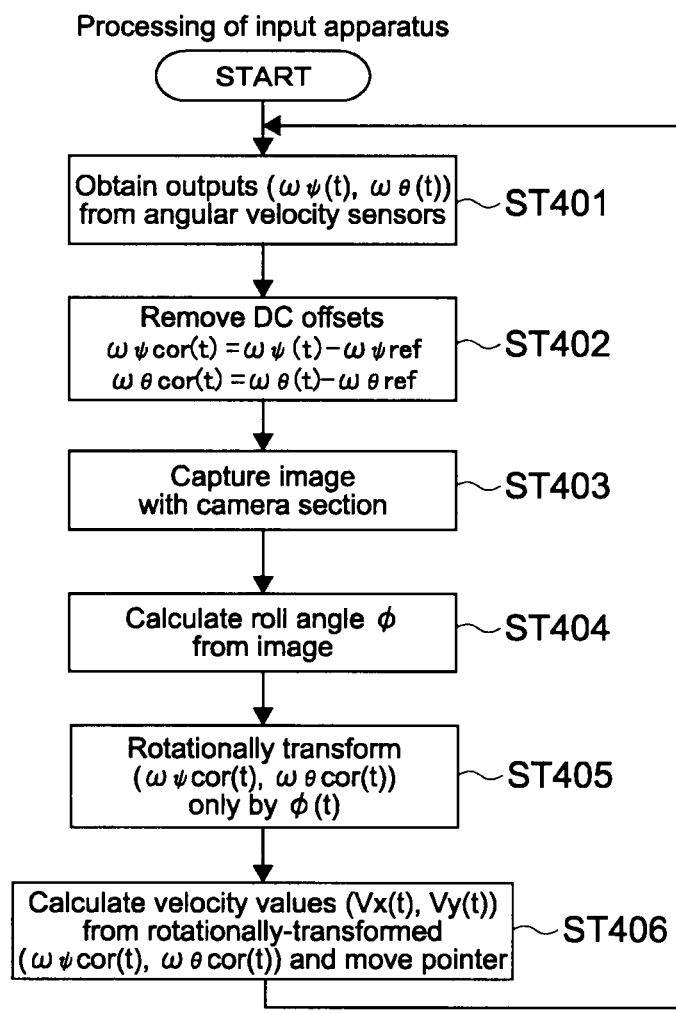
FIG. 14 is a flowchart of the roll tilt correction processing according to Modified Example 4 of the second embodiment of the present invention.

FIG. 14 is a flowchart of the roll tilt correction processing according to Modified Example 4. Hereinafter, the roll tilt correction processing according to Modified Example 4 will be described in detail along with the flowchart of FIG. 14.

The MPU 19 of the input apparatus 1 obtains biaxial angular velocity signals ($\omega_\psi(t)$, $\omega_\theta(t)$) from the angular velocity sensor unit 15 in a predetermined cycle (Step 401). Subsequently, the MPU 19 obtains biaxial angular velocity values ($\omega_\psi cor(t)$, $\omega_\theta cor(t)$) by subtracting DC offsets ($\omega_\psi ref$, $\omega_\theta ref$) in the axial directions from the biaxial angular velocity signals ($\omega_\psi(t)$, $\omega_o(t)$), respectively (Step 402).

Next, the MPU 19 of the input apparatus 1 controls the camera section 52 to take in an image (Step 403). The MPU 19 recognizes a linear component to be a reference axis from the image taken in by the camera section 52 and obtains a tilt of the reference axis in the camera field angle as a roll angle φ of the input apparatus 1 (Step 404).

Here, the linear component to be the reference axis in the image taken by the camera section 52 of the input apparatus 1 includes, for example, a casing of the display apparatus 5 and an outer frame of a screen. Further, a boundary between a ceiling and a wall, a boundary between a floor and a wall, a window frame, and the like in an image may also be recognized as the linear component to be the reference axis. Though such a recognition of images requires a certain amount of processing time, it is not so much as to impair operability of a user. Moreover, a sampling rate of images only needs to be several seconds. It is effective to perform automatic learning for enhancing accuracy of the image recognition.

After that, the MPU 19 of the input apparatus 1 rotationally transforms the angular velocity values ($\omega_\psi cor(t)$, $\omega_\theta cor(t)$) only by the roll angle φ (Step 405) and calculates velocity values ($V_x(t)$, $V_y(t)$) from the rotationally-transformed angular velocity values. The MPU 19 generates new coordinate values (X(t), Y(t)) using the calculated velocity values ($V_x t$), $V_y(t)$) and controls display on the screen 3 so that the pointer 2 moves to a position corresponding to the coordinate values (X(t), Y(t)) (Step 406).

Also by the processing of Modified Example 4 described above, the roll tilt correction of the input apparatus 1 can be performed by a relatively-easy operation.

Modified Example 5

Modified Example of Roll Tilt Correction

In the roll tilt correction processing described in the second embodiment, the roll angle φ is obtained by comparing the trajectory of coordinates that are based on an image taken by the camera section 51 and the trajectory of coordinates that are based on angular velocity values while performing a relative rotation transform. Therefore, it takes a certain amount of time to start the roll tilt correction.

In this regard, it is effective to provide, in the input apparatus 1, a feature portion that changes its form in the camera field angle depending on the roll angle φ. By recognizing the form of the feature portion from an image taken by the camera section 51, the control apparatus 40 can obtain a roll angle φ of the input apparatus 1. According to this system, a necessary operational amount can be markedly reduced and a time required to start the roll tilt correction can be shortened as compared to the roll tilt correction processing described in the second embodiment. Here, the feature portion provided in the input apparatus 1 can be realized by, for example, a plurality of light-emitting portions or a light-emitting portion having a relatively-large aspect ratio. Moreover, the feature portion is not limited to the light-emitting portion as long as it is a portion capable of performing extraction by an image recognition, such as a light reflection portion and a color difference portion. Further, the roll angle φ may also be obtained by recognizing an outer shape of the input apparatus 1.

Third Embodiment

Correction of Angular Velocity into Pseudo Linear velocity

Movement amounts of the pointer displayed on the screen depend on angular velocities detected by the two angular velocity sensors. Therefore, if a user applies a large angular velocity to the input apparatus, the pointer displayed on the screen moves at high speed in accordance therewith. When the user operates the input apparatus using a turn of a wrist (when radius gyration R(t) of operation is small) as shown in FIG. 15A, for example, the pointer moves at high speed even when an actual movement amount of the input apparatus is small. On the other hand, when the user operates the input apparatus while only slightly applying an angular velocity, the pointer moves only slightly on the screen even when the actual movement amount of the input apparatus is large. When the user operates the input apparatus by swinging the entire arm about a shoulder (when radius gyration R(t) of operation is large) as shown in FIG. 15B, for example, the pointer moves only slightly regardless of the actual movement amount of the input apparatus. Thus, there are cases where the movement of the pointer does not match the operational feeling of the user.

Figure 16:
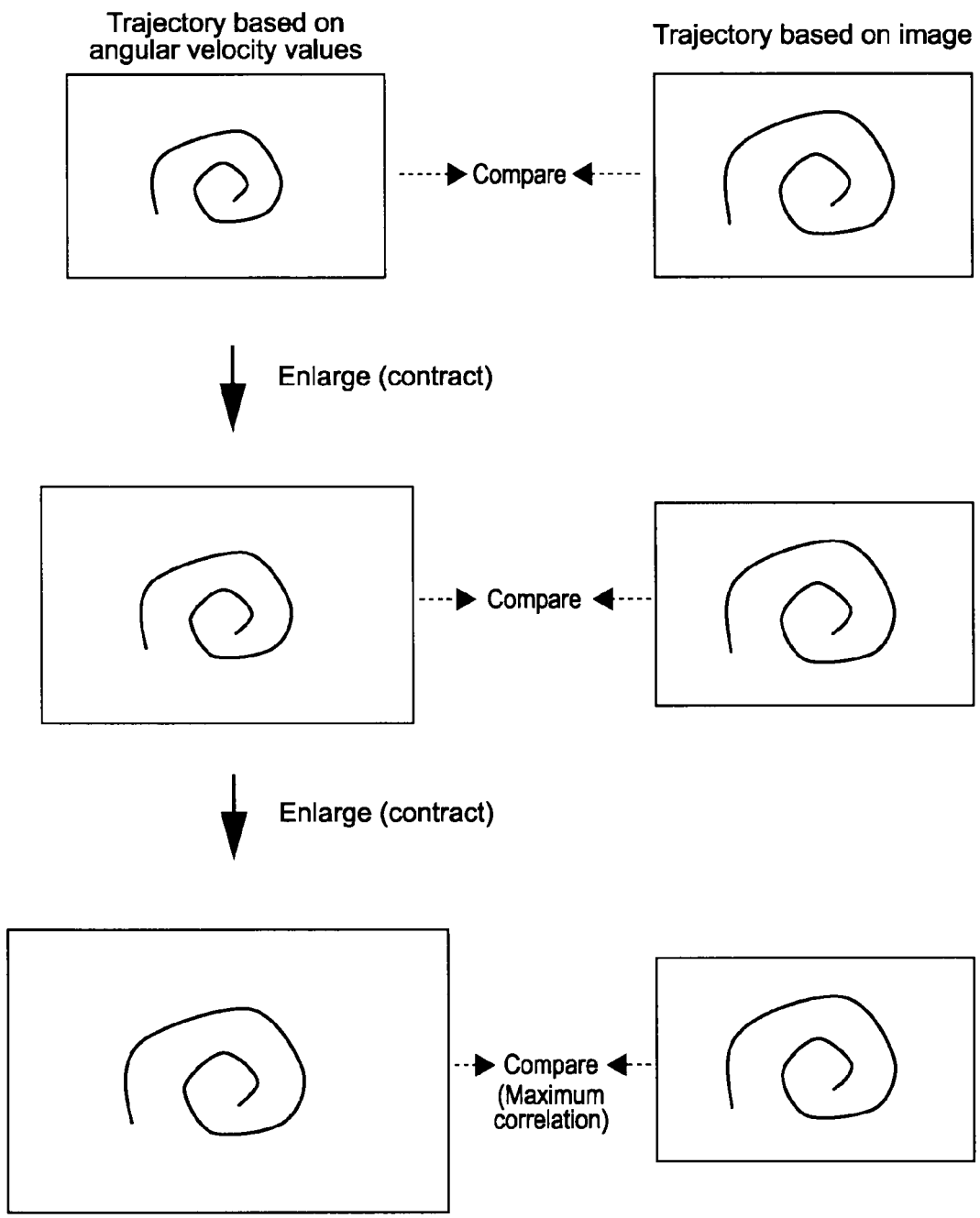
FIG. 16 is a diagram for explaining the processing of correcting angular velocities into pseudo linear velocities according to the third embodiment of the present invention.

In this regard, the control apparatus 40 according to the third embodiment repetitively compares a trajectory obtained by multiplying an enlargement factor to a trajectory of coordinates that are based on angular velocity values and a trajectory of coordinates that are based on an image as shown in FIG. 16 while changing the enlargement factor and judges an enlargement factor G(t) with which a highest correlation is obtained. The control apparatus 40 calculates values obtained by multiplying angular velocity values by the enlargement factor G(t) as pseudo linear velocities. As a result, it is possible to prevent a difference in the radius gyrations R(t) in operations from largely influencing the movement amounts of the pointer.

Figure 17:
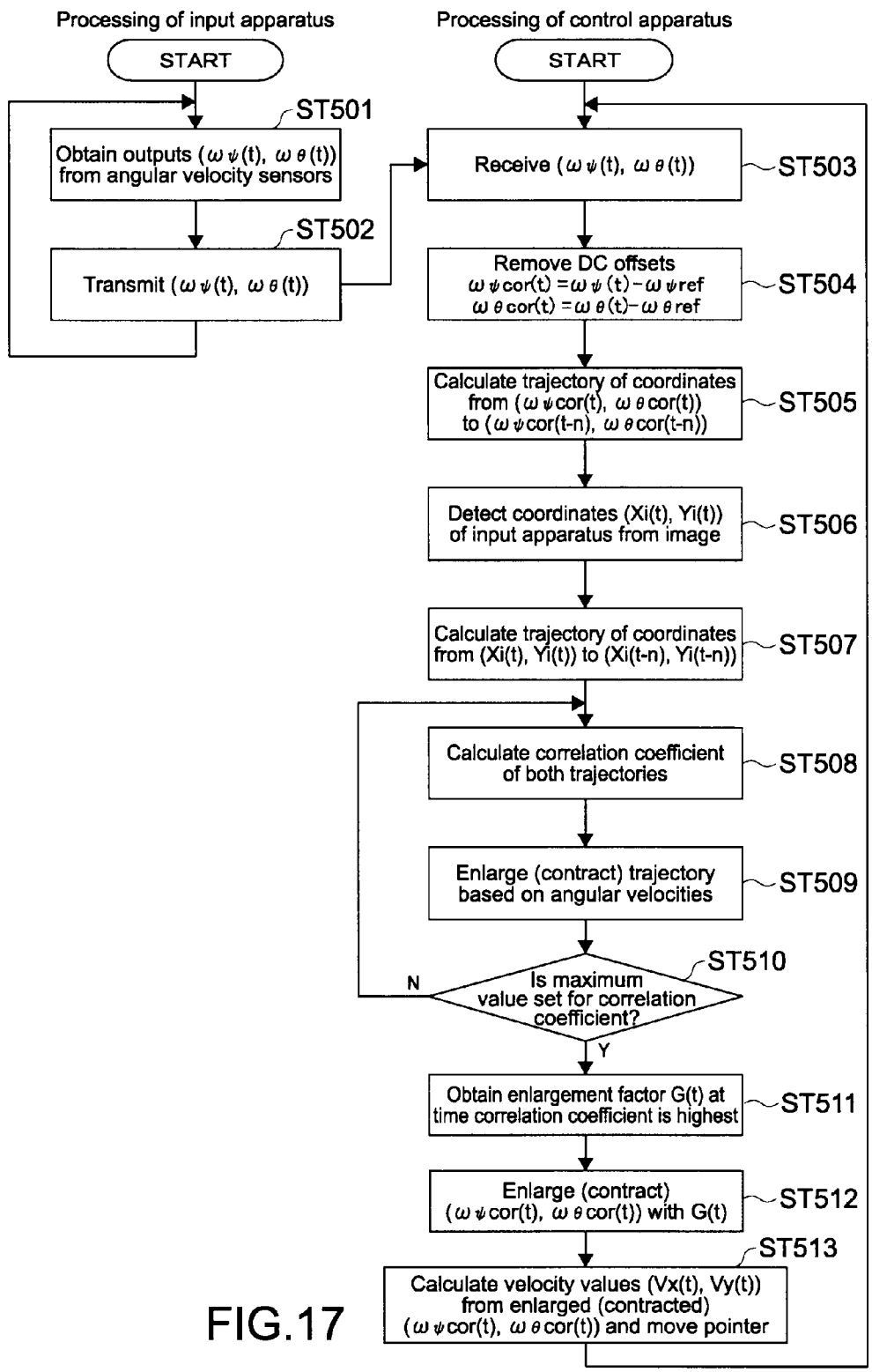
FIG. 17 is a flowchart of the processing of correcting angular velocities into pseudo linear velocities according to the third embodiment of the present invention.

FIG. 17 is a flowchart of the processing of correcting angular velocity values into pseudo linear velocities according to the third embodiment. Hereinafter, the processing of correcting angular velocity values into pseudo linear velocities according to the third embodiment will be described in detail along with the flowchart of FIG. 17.

Here, operations from Steps 501 to 507 are the same as those of Steps 301 to 307 of the roll tilt correction processing according to the second embodiment.

The MPU 35 of the control apparatus 40 repetitively compares a trajectory obtained by multiplying an enlargement factor to a trajectory of coordinates that are based on angular velocity values and a trajectory of coordinates that are based on an image while changing the enlargement factor and judges an enlargement factor G(t) with which a highest correlation is obtained (Steps 508 to 511).

Subsequently, the MPU 35 enlarges (contracts) the angular velocity values ($\omega_\psi$cor(t), $\omega_\theta$cor(t)) by the enlargement factor G(t) (Step 512) and calculates velocity values ($V_x(t)$, $V_y(t)$) based on the enlarged (contracted) angular velocity values. Then, the MPU 35 uses the calculated velocity values ($V_x(t)$, $V_y(t)$) to generate new coordinate values (X(t), Y(t)) and controls display on the screen 3 so that the pointer 2 moves to a position corresponding to the coordinate values (X(t), Y(t)) (Step 513).

Incidentally, the enlargement factor G(t) is a value obtained by multiplying the radius gyration R(t) of the operation of the input apparatus 1 by a constant C. Here, the constant C varies depending on a distance between the input apparatus 1 and the camera section 51. In other words, the constant C increases as the distance between the input apparatus 1 and the camera section 51 increases, with the result that the radius gyration R(t) reduces that much and a movement (linear velocities) of the pointer on the screen becomes small. On the contrary, the constant C decreases as the distance decreases, with the result that the radius gyration R(t) increases that much and a movement (linear velocities) of the pointer on the screen becomes large. Therefore, if the constant C is known, the radius gyration R(t) can be obtained by dividing the enlargement factor G(t) by the constant C, and by multiplying the radius gyration R(t) by the angular velocity values ($\omega_\psi$cor(t), $\omega_\theta$cor(t)), pseudo linear velocities that takes the distance between the input apparatus 1 and the camera section 51 into account can be obtained.

There are, for example, the following methods as a method of obtaining a constant C.

1. Luminance of a light-emitting portion is inversely proportional to a square of the distance between the input apparatus 1 and the camera section 51. In this regard, the control apparatus 40 obtains luminance of a luminous point in an image taken by the camera section 51, obtains the distance from the obtained luminance, and calculates a constant C based on the distance.

2. A plurality of light-emitting portions are provided in the input apparatus 1. The control apparatus 40 obtains a distance between the plurality of light-emitting portions from an image and calculates a constant C based on the distance.

3. The control apparatus 40 obtains a radius gyration R(t) at a time of use for each user in a test mode or a distribution of radius gyrations R(t) at the time of use for all users in advance and statistically estimates a constant C based on the distribution.

It should be noted that the series of processes shown in the flowchart of FIG. 17 may all be carried out in the input apparatus 1.

The corrections according to the above embodiments and modified examples are not so much as to make the user feel awkward even when executed with a several-second delay. This is because, specifically, while a pointer movement operation can be directly sensed by the user even with a slight delay of about several-ten ms, a delay due to a DC offset correction, a roll tilt correction, and a linear velocity correction does not appear in a form that can be directly sensed by the user.

Fourth Embodiment (Correction of integration error of pointer coordinates)

A calculation of coordinates of the pointer on the screen is carried out by successively adding velocity values obtained from angular velocity values to coordinate values of the pointer up to that time point. Thus, there are cases where, by an accumulation of errors due to various causes included in the angular velocity values, the pointer moves to coordinates that do not match an operational feeling of the user, that is, the pointer is deviated from absolute coordinates. As the cause of the error of the angular velocity values, there are, in addition to variations of sensitivities of the angular velocity sensors and quantization errors, the roll tilt correction and the calculation of pseudo linear velocities. Further, the deviation from the absolute coordinates may also be caused by operational processing related to operability of the pointer, such as a hand movement correction and variable control of a velocity gain (e.g., processing of moving, when an input apparatus is moved slowly, a pointer more slowly than when moving the input apparatus), and a process of fixing the coordinates of the pointer by an operation of a pointer movement availability switch.

In this regard, the control apparatus 40 according to the fourth embodiment corrects integration errors of pointer coordinates by increasing or decreasing angular velocity values such that a difference between coordinates that are based on angular velocity values and coordinates that are based on an image becomes small.

Figure 18:
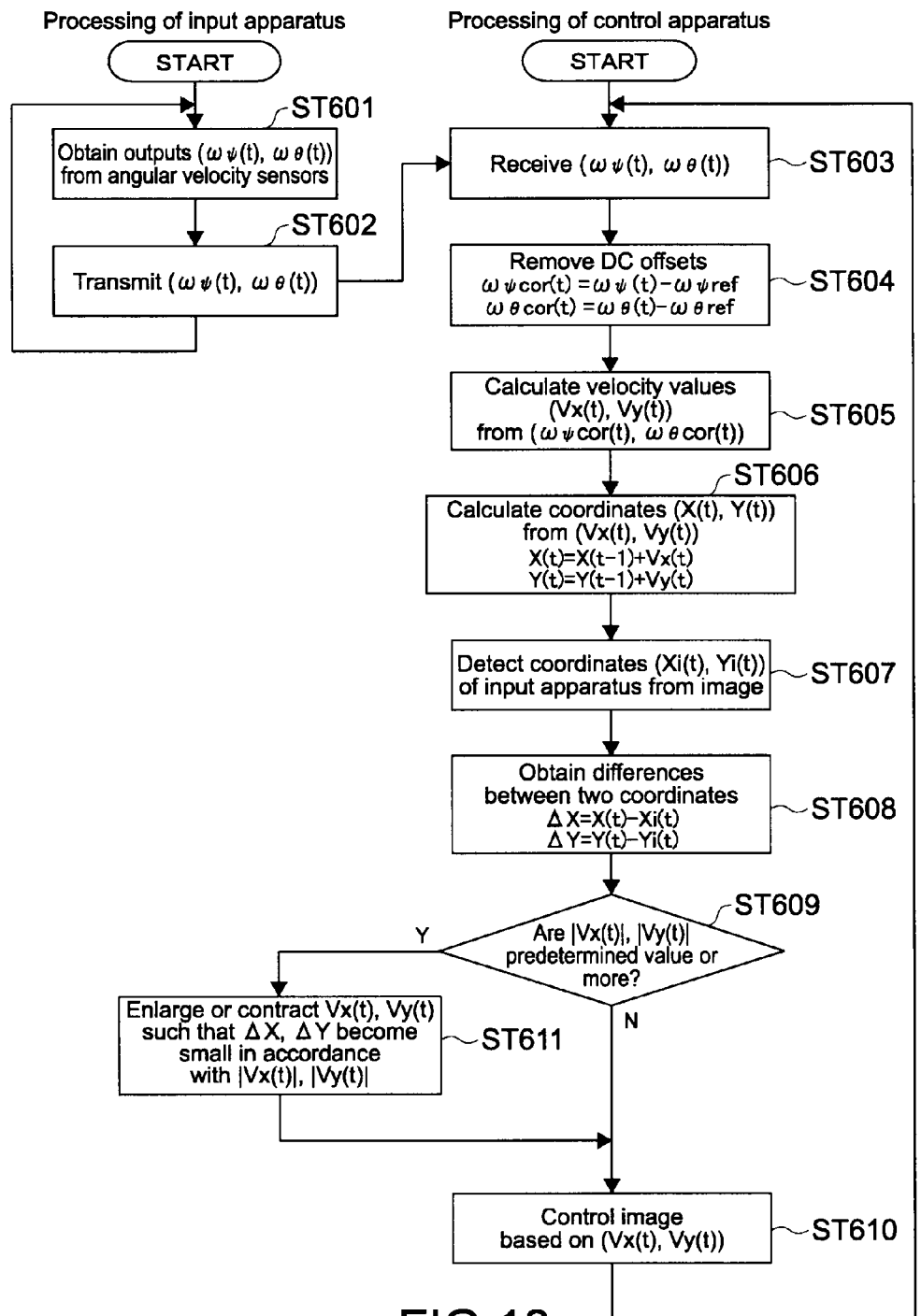
FIG. 18 is a flowchart of processing of correcting an integration error of pointer coordinates according to a fourth embodiment of the present invention.

FIG. 18 is a flowchart of processing of correcting an integration error of pointer coordinates according to the fourth embodiment. Hereinafter, the processing of correcting an integration error of pointer coordinates according to the fourth embodiment will be described in detail along with the flowchart of FIG. 18.

Here, operations from Steps 601 to 604 are the same as those of Steps 101 to 104 of the DC offset correction processing according to the first embodiment.

In Step 605, the MPU 35 of the control apparatus 40 calculates velocity values $(V_x(t), V_y(t))$ based on angular velocity values $(\omega_\psi cor(t), \omega_\theta cor(t))$ (Step 605). The MPU 35 uses the calculated velocity values $(V_x(t), V_y(t))$ to generate new coordinate values $(X(t), Y(t))$ (Step 606).

Next, the MPU 35 detects coordinates $(Xi(t), Yi(t))$ of the input apparatus 1 within a camera field angle from an image taken by the camera section 51 (Step 607).

After that, the MPU 35 obtains differences $(\Delta X, \Delta Y)$ between the coordinate values $(X(t), Y(t))$ and the coordinates $(Xi(t), Yi(t))$ (Step 608).

The MPU 35 judges whether absolute values of the differences $(\Delta X, \Delta Y)$ are a predetermined value or more (Step 609). When the absolute values of the differences $(\Delta X, \Delta Y)$ are a predetermined value or more (YES in Step 609), the MPU 35 increases or decreases the velocity values $(V_x(t), V_y(t))$ such that the differences $(\Delta X, \Delta Y)$ become small in accordance with the absolute values of the differences $(\Delta X, \Delta Y)$ (Step 611). After that, the MPU 35 uses the increased or decreased velocity values to generate new coordinate values $(X(t), Y(t))$ and controls display on the screen 3 so that the pointer 2 moves to a position corresponding to the coordinate values $(X(t), Y(t))$ (Step 610). On the other hand, when the absolute values of the differences $(\Delta X, \Delta Y)$ are smaller than the predetermined value (NO in Step 609), the MPU 35 uses the velocity values $(V_x(t), V_y(t))$ to generate new coordinate values $(X(t), Y(t))$ and controls display on the screen 3 so that the pointer 2 moves to a position corresponding to the coordinate values $(X(t), Y(t))$ (Step 610).

When increasing or decreasing the velocity values $(V_x(t), V_y(t))$ such that the differences $(\Delta X, \Delta Y)$ become small in accordance with the absolute values of the differences $(\Delta X, \Delta Y)$, it is more favorable to move the pointer such that it gradually approaches the absolute coordinates than moving it to the absolute coordinates at one stroke in view of preventing the user from feeling awkward.

Figure 19A:
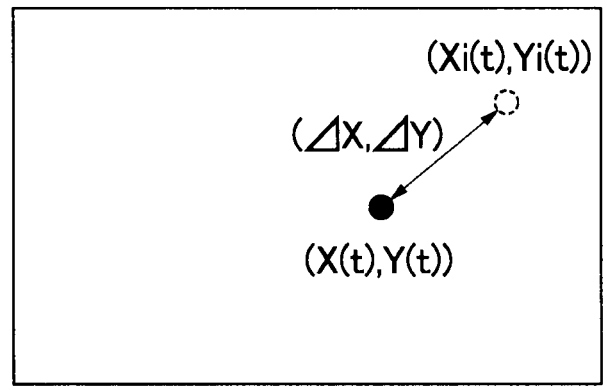
FIG. 19 are diagrams showing a specific example of the processing of correcting an integration error of pointer coordinates on the screen according to the fourth embodiment of the present invention.
Figure 19B:
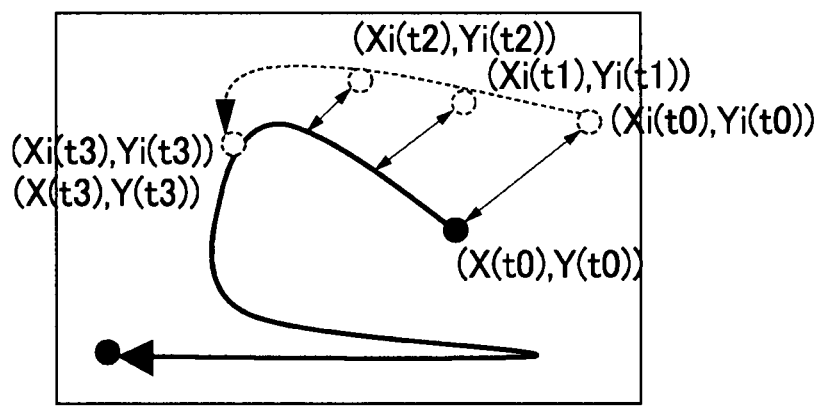

FIG. 19 are diagrams showing a specific example of the processing of correcting an integration error of pointer coordinates on the screen according to the fourth embodiment. FIG. 19A shows differences $(\Delta X, \Delta Y)$ between coordinates $(X(t), Y(t))$ that are based on angular velocity values and coordinates $(Xi(t), Yi(t))$ that are based on an image. FIG. 19B is a diagram showing the processing of correcting pointer coordinates $(X(t), Y(t))$, in which a solid line represents a trajectory of coordinate values $(X(t), Y(t))$ that are based on angular velocity values and a dotted line represents a trajectory of coordinates $(Xi(t), Yi(t))$ that are based on an image.

The pointer coordinate correction processing is carried out by, for example, adding correction amounts calculated based on the velocity values $(V_x(t), V_y(t))$ before the correction to the velocity values $(V_x(t), V_y(t))$ before the correction so that the pointer gradually approaches the absolute coordinates. For example, in FIG. 19B, the control apparatus 40 corrects velocity values $(V_x(t0), V_y(t0))$ by correction amounts calculated based on velocity values $(V_x(t0), V_y(t0))$ at a time t0 before the correction. Moreover, the control apparatus 40 corrects velocity values $(V_x(t1), V_y(t1))$ by correction amounts calculated based on velocity values $(V_x(t1), V_y(t1))$ at a time t1 before the correction. After that, corrections are carried out similarly at times t2 and t3.

More specifically, the correction amounts are calculated such that the correction becomes smaller as the velocity values $(V_x(t), V_y(t))$ before the correction become smaller. Further, the correction amounts at a time the velocity values $(V_x(t), V_y(t))$ before the correction are "0" may be "0". Accordingly, the correction is gradually performed along with the movement of the pointer made by the operation of the input apparatus 1, and a natural correction when seen from the user becomes possible.

It should be noted that although the correction is gradually performed a plurality of times so as not to impair a natural movement of the pointer during the correction in this embodiment, it is also possible to perform the correction such that the differences become "0" at one stroke as the situation demands.

As a case where a correction of a position of a pointer at one stroke is effective, there is a UI screen switch timing. The control apparatus 40 temporarily hides the pointer right before a switch of a UI screen and causes the pointer to appear at the absolute coordinates after the switch of the UI screen. Even when the pointer is thus caused to suddenly appear at the absolute coordinates at the time of the switch of the UI screen, the user does not feel much awkwardness, and the switch timing is a favorable opportunity to correct an integration error of the pointer coordinates.

It should be noted that the series of processes shown in the flowchart of FIG. 18 may all be carried out in the input apparatus 1.

Modified Example 6

Absolute Coordinate System Shift Processing

A pointer movement availability button (see FIG. 2 (button 11)) for switching an availability of a pointer movement is provided in the input apparatus 1. Assuming that the availability of the pointer movement is sequentially switched from "available"→"unavailable"→"available" by an operation made to the pointer movement availability button by the user, it is natural in terms of an operation for the pointer to be positioned at the same coordinates right before a switch is made to the "unavailable" state by the user and right after a switch is made from the "unavailable" state to the "available" state.

However, since the detection of coordinates that are based on an image is carried out by the control apparatus 40 also in the "unavailable" state, a situation in which the pointer is moved to coordinates unintended by the user may occur at the time the user makes a switch from the "unavailable" state to the "available" state.

In this regard, the control apparatus 40 of Modified Example 6 detects the coordinates of the pointer at a time the control apparatus 40 is notified of the switch to the "unavailable" state by the input apparatus 1 based on an image and stores them. After that, the control apparatus 40 detects the coordinates of the input apparatus 1 based on an image taken by the camera section 51 when notified of the switch to the "available" state by the input apparatus 1. Then, the control apparatus 40 obtains differences between the stored coordinates and the newly-detected coordinates and uses the differences to shift a reference point in an absolute coordinate space that is used in detecting the coordinates based on an image.

Accordingly, the coordinates of the pointer right before the pointer movement is switched to the "unavailable" state and the coordinates of the pointer right after the pointer movement is switched to the "available" state from the "unavailable" state can be made to coincide.

Although the reference point in the absolute coordinate space is shifted along with the switch of the pointer movement availability by the operation made to the pointer movement availability button of the input apparatus 1 in the descriptions above, the same processing may be carried out by providing a coordinate change switch in the input apparatus 1. In this case, the control apparatus 40 detects, in response to a first coordinate change instruction made by an operation to the coordinate change switch of the input apparatus 1, the coordinates of the pointer at that time point based on an image and stores them. Upon receiving a second coordinate change instruction made by an operation to the coordinate change switch of the input apparatus 1, the control apparatus 40 detects the coordinates of the pointer at that time point based on an image. Then, the control apparatus 40 obtains differences between the first and second coordinates of the pointer and sets a position that is deviated from the reference point in the absolute coordinate space by an amount corresponding to the differences as a new reference point in the absolute coordinate space.

Moreover, although the reference point in the absolute coordinate space used in detecting coordinates that are based on an image is shifted in the descriptions above, it is also possible to shift a reference point in a coordinate space used in detecting coordinates that are based on angular velocity values that have been detected by the angular velocity sensors. Also in this case, the coordinates of the pointer right before the pointer movement is switched to the "unavailable" state and the coordinates of the pointer right after the pointer movement is switched to the "available" state from the "unavailable" state can be made to coincide.

Modified Example 7

There may be a case where coordinates of the light-emitting portion 29 of the input apparatus 1 are not detected due to limits on a field angle (blind angle) and resolution of the image sensor used in the above embodiments. In this case, outputs of the angular velocity sensors are not corrected by the output of the image sensor.

In this regard, it is possible for the control apparatus to constantly hold, regarding the values calculated for the correction in the above embodiments and modified examples, the lastly-obtained values and perform the correction using the lastly-obtained values at a time a sufficient image cannot be obtained from the camera section. Alternatively, it is also possible to tentatively use values statistically obtained from the values obtained in the past.

Further, coordinates that are based on an image may be used as the coordinates of the pointer on the screen during a period that the coordinates that are based on an image can be obtained from the camera section, and coordinates that are based on outputs of the angular velocity sensors may be used as the coordinates of the pointer on the screen during a period that an image cannot be obtained from the camera section.

In the above embodiments, the input apparatus 1 transmits input information to the control apparatus wirelessly. However, the input information may be transmitted by wires.

The present invention may be applied to, for example, a handheld-type electronic apparatus or information processing apparatus (handheld apparatus) including a display section. Specifically, the handheld apparatus is considered to be an apparatus in which the input apparatus 1 and the control apparatus 40 are integrated. In this case, the user moves a main body of the handheld apparatus to move a pointer displayed on a screen of the display section or cause an image displayed on the display section to be scrolled or zoomed in/out. Examples of the handheld apparatus include a PDA (Personal Digital Assistance), a cellular phone, a portable music player, and a digital camera.

The detection axes of each of the angular velocity sensor unit 15 and the acceleration sensor unit 16 of the sensor unit 17 do not necessarily need to be mutually orthogonal like the X' axis and the Y' axis. In this case, the accelerations respectively projected in the mutually-orthogonal axial directions can be obtained by a calculation that uses a trigonometric function. Similarly, the angular velocities about the mutually-orthogonal axes can be obtained by the calculation that uses the trigonometric function.

Regarding the sensor unit 17 described in the above embodiments, the descriptions have been given on the case where the detection axes of the X' axis and the Y' axis of the angular velocity sensor unit 15 and the detection axes of the X' axis and the Y' axis of the acceleration sensor unit 16 respectively match each other. However, the detection axes do not necessarily need to match. For example, in a case where the angular velocity sensor unit 15 and the acceleration sensor unit 16 are mounted on a substrate, the angular velocity sensor unit 15 and the acceleration sensor unit 16 may be mounted while the detection axes thereof are deviated a predetermined rotational angle on a main surface of the substrate so that the detection axes do not match. In this case, the accelerations and angular velocities on the respective axes can be obtained by the calculation that uses the trigonometric function.

Instead of the angular velocity sensor unit 15, an angle sensor or an angular acceleration sensor may be used. Examples of the angle sensor include a geomagnetic sensor and an image sensor. When triaxial geomagnetic sensors are used, for example, since change amounts of angle values are detected, angular velocity values can be calculated by differentiating the angle values. The angular acceleration sensor is constituted as a combination of a plurality of acceleration sensors, and angular velocity values can be calculated by integrating angular acceleration values obtained by the angular acceleration sensors.

The above embodiments and modified examples can be used in combination as appropriate.

The present application contains subject matter related to that disclosed in Japanese Priority Patent Application JP 2009-189486 filed in the Japan Patent Office on Aug. 18, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An operation input system that includes a casing and a motion sensor for detecting a movement of the casing inside the casing and calculates a position of the casing in a predetermined space based on an output of the motion sensor, the operation input system comprising:

a position sensor configured to directly detect the position of the casing in the predetermined space;

correction circuitry configured to correct the output of the motion sensor using an output of the position sensor;

switch circuitry configured to switch on/off the output of the motion sensor; and coordinate reference change circuitry configured to change one of a reference of spatial coordinates of the position sensor and a reference of spatial coordinates of the motion sensor using a difference between a first position of the casing calculated right before the output of the motion sensor is switched off by the switch circuitry and a second position of the casing calculated right after the output of the motion sensor is switched on by the switch circuitry.

2. The operation input system according to claim 1, wherein the correction circuitry is configured to calculate information for correcting the output of the motion sensor based on a relationship between the output of the motion sensor within a predetermined time and the output of the position sensor within the predetermined time.

3. The operation input system according to claim 2, wherein the motion sensor detects the movement of the casing in a space of a two or more dimension, wherein the position sensor directly detects the position of the casing in the space of a two or more dimension, and wherein the correction circuitry is configured to calculate the information for correcting the output of the motion sensor based on a relationship between the movement of the casing obtained from the output of the motion sensor and a positional change of the casing detected by the position sensor.

4. The operation input system according to claim 3, wherein the motion sensor outputs a potential fluctuation with respect to a set reference potential as a detection signal, and wherein the correction circuitry is configured to calculate a calibration value of the reference potential as the information for correcting the output of the motion sensor.

5. The operation input system according to claim 4, wherein the correction circuitry is configured to calculate the information for correcting the output of the motion sensor based on a relationship between an integration value of the output of the motion sensor and a displacement amount of the output of the position sensor.

6. The operation input system according to claim 5, wherein the correction circuitry is configured to calculate the information for correcting the output of the motion sensor based on the integration value of the output of the motion sensor at a time the displacement amount of the output of the position sensor becomes a predetermined value or less.

7. The operation input system according to claim 6, wherein the motion sensor is an angular velocity sensor, and wherein the position sensor is an image sensor.

8. The operation input system according to claim 2, wherein the motion sensor detects the movement of the casing in a space of a two or more dimension, wherein the position sensor directly detects the position of the casing in the space of a two or more dimension, and wherein the correction circuitry is configured to calculate the information for correcting the output of the motion sensor based on a relationship between a first trajectory of the movement of the casing obtained from the output of the motion sensor and a second trajectory of a positional change of the casing detected by the position sensor.

9. The operation input system according to claim 8, wherein the correction circuitry is configured to calculate a difference between a rotational angle of the first trajectory and that of the second trajectory as the information for correcting the output of the motion sensor.

10. The operation input system according to claim 2, wherein the motion sensor detects the movement of the casing in a space of a two or more dimension, wherein the position sensor directly detects the position of the casing in the space of a two or more dimension, and wherein the correction circuitry is configured to calculate the information for correcting the output of the motion sensor based on a relationship between a first displacement amount of the movement of the casing calculated from the output of the motion sensor and a second displacement amount of the position of the casing detected by the position sensor.

11. The operation input system according to claim 10, wherein the correction circuitry is configured to calculate a ratio of the first displacement amount to the second displacement amount as the information for correcting the output of the motion sensor.

12. The operation input system according to claim 2, wherein the correction circuitry is configured to calculate the information for correcting the output of the motion sensor based on a relationship between a first position of the casing obtained from the output of the motion sensor and a second position of the casing detected by the position sensor.

13. The operation input system according to claim 12, wherein the correction circuitry is configured to calculate a difference between the first position and the second position as the information for correcting the output of the motion sensor.

14. An operation input system, comprising:
an input apparatus including
a casing, and
a motion sensor for detecting a movement of the casing inside the casing;
a position sensor to directly detect a position of the casing in a predetermined space; and
a control apparatus to calculate the position of the casing in the predetermined space based on an output of the motion sensor, the control apparatus including
circuitry configured to:
correct the output of the motion sensor using an output of the position sensor, switch on/off the output of the motion sensor, and
change one of a reference of spatial coordinates of the position sensor and a reference of spatial coordinates of the motion sensor using a difference between a first position of the casing calculated right before the output of the motion sensor is switched off and a second position of the casing calculated right after the output of the motion sensor is switched on.

15. A control apparatus calculating, based on an output of a motion sensor transmitted from an input apparatus including a casing and the motion sensor for detecting a movement of the casing, a position of the casing in a predetermined space, the control apparatus comprising:
circuitry configured to:
correct the output of the motion sensor using an output of a position sensor for directly detecting the position of the casing in the predetermined space, switch on/off the output of the motion sensor, and
change one of a reference of spatial coordinates of the position sensor and a reference of spatial coordinates of the motion sensor using a difference between a first position of the casing calculated right before the output of the motion sensor is switched off and a second position of the casing calculated right after the output of the motion sensor is switched on.

16. A handheld apparatus, comprising:
a casing;
a display section to display an operation screen;
a motion sensor to detect a movement of the casing;
calculation circuitry configured to calculate a position of the casing in a predetermined space based on an output of the motion sensor;
a position sensor to directly detect the position of the casing in the predetermined space;
correction circuitry configured to correct the output of the motion sensor using an output of the position sensor;
switch circuitry configured to switch on/off the output of the motion sensor; and
coordinate reference change circuitry configured to change one of a reference of spatial coordinates of the position sensor and a reference of spatial coordinates of the motion sensor using a difference between a first position of the casing calculated right before the output of the motion sensor is switched off by the switch circuitry and a second position of the casing calculated right after the output of the motion sensor is switched on by the switch circuitry.

17. An operation input method, comprising:
detecting, by a motion sensor incorporated in an input apparatus, a movement of a casing of the input apparatus;
directly detecting, by a position sensor, a position of the casing in a predetermined space;
correcting an output of the motion sensor using an output of the position sensor;
calculating the position of the casing in the predetermined space based on the output of the motion sensor; switching on/off the output of the motion sensor;
changing one of a reference of spatial coordinates of the position sensor and a reference of spatial coordinates of the motion sensor using a difference between a first position of the casing calculated right before the output of the motion sensor is switched off and a second position of the casing calculated right after the output of the motion sensor is switched on.

18. A control apparatus calculating, based on an output of a motion sensor transmitted from an input apparatus including a casing and the motion sensor for detecting a movement of the casing, a position of the casing in a predetermined space, the control apparatus comprising:
a correction means for correcting the output of the motion sensor using an output of a position sensor for directly detecting the position of the casing in the predetermined space, a switch means for switching on/off the output of the motion sensor and
a coordinate reference change means for changing one of a reference of spatial coordinates of the position sensor and a reference of spatial coordinates of the motion sensor using a difference between a first position of the casing calculated right before the output of the motion sensor is switched off by the switch means and a second position of the casing calculated right after the output of the motion sensor is switched on by the switch means.

* * * * *